United States Patent [19]
Katayama et al.

[11] Patent Number: 5,715,479
[45] Date of Patent: Feb. 3, 1998

[54] BLUR PREVENTION DEVICE FOR PREVENTING IMAGE BLUR

[75] Inventors: Akira Katayama, Koganei; Yoshio Imura; Tadao Kai, both of Kawasaki; Yasushi Sakagami; Etsuo Tanaka, both of Tokyo, all of Japan

[73] Assignee: Nikon Corporation, Tokyo, Japan

[21] Appl. No.: 553,198

[22] Filed: Nov. 7, 1995

Related U.S. Application Data

[63] Continuation of Ser. No. 270,726, Jul. 5, 1994, abandoned.

[30] Foreign Application Priority Data

| Jul. 5, 1993 | [JP] | Japan | 5-190981 |
| Jul. 8, 1993 | [JP] | Japan | 5-192678 |
| Jul. 21, 1993 | [JP] | Japan | 5-180267 |

[51] Int. Cl.⁶ ............................................. G03B 17/00
[52] U.S. Cl. .................................... 396/55; 348/208
[58] Field of Search ......................... 396/52, 55; 348/208

[56] References Cited

U.S. PATENT DOCUMENTS

| 5,172,276 | 12/1992 | Ueyama et al. | 359/813 |
| 5,394,207 | 2/1995 | Fujisaki . | |
| 5,416,558 | 5/1995 | Katayama et al. | 396/55 |
| 5,581,317 | 12/1996 | Kitagawa et al. | 396/55 |

*Primary Examiner*—David M. Gray

[57] ABSTRACT

A blur prevention device is equipped with first and second drive units which can move a blur prevention lens in a plane orthogonal to an optical axis of a main optical system. First and second transfer units transfer the amount of movement of the drive units to the blur prevention lens and first and second transfer receiving units receive the amount of movement in the respective directions from the respective transfer units. Each of the transfer receiving units can move relative to the one transfer unit other than the respective transfer unit. The blur prevention device has a specified direction for one of the transfer units and allows a degree of freedom outside the movement in the specified direction to the other transfer unit. Restriction gears, which are part of the drive units, restrict the amount of movement of the blur prevention lens in the plane orthogonal to the optical axis. And, by integrating a lens shutter or aperture with the blur prevention device, the blur prevention lens may be easily positioned in a central position of its drive range.

25 Claims, 19 Drawing Sheets

BLUR PREVENTION DEVICE FOR PREVENTING IMAGE BLUR

This application is a continuation, of application Ser. No. 08/270,726, filed Jul. 5, 1994, now abandoned.

BACKGROUND OF THE INVENTION

1. Field of the Invention

The present invention relates to a blur prevention device and, more particularly, to a blur prevention device which prevents image blur caused by hand vibration and the like, in cameras and other optical devices.

2. Description of the Related Art

Recent cameras have undergone a remarkable amount of advancement by using electronic parts, especially in auto-matic exposure mechanisms and auto-focus mechanisms, and have become highly automated. However, when trying to automate these kinds of cameras, one insufficiency that has occurred has been image blur resulting from hand vibration and the like which is easily produced when taking hand-held photographs. Various countermeasures have attempted to overcome this insufficiency.

In the past, there have been blur prevention devices which attempt to prevent image blur produced by camera movement and, in particular, image blur produced by the camera vibrating or being tilted. These blur prevention devices have been based on detecting the state of the camera shake by way of a vibration detection unit, using a photographic lens system (main optical system), or an optical system that is one part of the photographic lens system, as the blur prevention optical system (blur prevention lens) and, corresponding to the detection results, shifting the blur prevention optical system in a direction which is at a right angle to the optical axis.

Specifically, in a camera which has this kind of blur prevention function, and has a blur prevention optical system (hereinafter called the "blur prevention lens") which comprises at least one part of the photographic lens system that is supported so that it can move, attempts have been made to correct focal position discrepancies which are caused by vibration. The blur prevention function cancels out image blur by moving the blur prevention lens in a direction which absorbs the vibration and in a plane which is at a right angle to the optical axis of a main optical system of the camera.

A drive mechanism disclosed, for example, in Japanese Patent Publication No. 3110530 was proposed for the purpose of shifting the blur prevention lens in a blur prevention device of this kind.

This known drive mechanism has a structure in which a lens frame of the blur prevention lens is retained so as to be movable in a direction at a right angle to the optical axis, and the blur prevention lens is moved by direct drive based on being acted upon through a linkage device (based on load members and drive shafts) which transmits drive power from a drive unit (motor, gear array, levers, screw shafts, ball beatings and V grooves, etc.) to a lens frame member as a pressing force or a tensile force.

In this regard, according to the known drive mechanism described above, while the regulation of the drive in the x axis direction of the blur prevention lens is performed by the ball beatings provided on a drive member of the y axis side and the V groove parts provided on the lens frame member, regulation of the drive in the y axis direction is performed by ball bearings provided on the drive member of the x axis side and V groove parts provided on the lens frame member.

However, in the structure of the drive mechanism described above, when, for example, there is one ball bearing in each of the drive members, the resistance force in relation to the displacement of the lens frame member that accompanies rotation centered on the optical axis is extremely weak, the correct drive force in the x axis direction of the lens frame member is confounded with the drive force in the y axis direction, and it becomes difficult to correctly drive the lens frame member in the x axis and y axis directions.

In order to prevent this kind of problem, for example, two ball bearings or multiple ball bearings are used in each of the drive members, and may be supported by providing enough width in relation to the respective V groove parts. Nonetheless, when adopting this kind of structure, the mechanism becomes excessively constrained by having four or more points of constraint, and it becomes difficult to guarantee smooth lens drive and precision in the installation of the various parts.

In particular, when connecting the lens frame and the drive members of the x axis side and y axis side at the four points of contact described above, high contact pressure in certain parts may be caused by errors in the production of parts, or assembly errors, etc. This invites a condition of excessive constraint, i.e., a so-called "half strike" is produced, and this in tun results in unnecessary stress on the parts caused by an increase of the amount of partial abrasion and rolling force in the contact parts, and an imbalance in the drive force transfer parts. Because these problems which inhibit a smooth and stabilized drive in the x axis and the y axis directions cannot be avoided, it is desirable to achieve a countermeasure that will deal with all of these kinds of problems.

With regard to controlling the drive of the blur prevention lens to match the state of blur, it is desirable to drive the blur prevention lens at high speed and with high precision, and it is necessary to accurately and reliably detect the position of the blur prevention lens and to install an additional restriction unit for the purpose of restricting the shift range of the blur prevention lens within a specified range.

Specifically, it must be taken into consideration that if this kind of blur prevention lens is moved more than necessary, the lens frame and the drive unit may accidentally collide or interfere with other mechanisms and parts and, therefore, it is necessary to restrict the shift range of the blur prevention lens within a specified range.

For this purpose, a detection unit which detects the position of the blur prevention lens and a restriction unit which restricts the shift range of the blur prevention lens are variously and independently provided in the previously described blur prevention device. By suitably using these units, the amount of shift of the blur prevention lens is restricted within the specified range.

Nonetheless, in this kind of known structure, the use of an independent detection unit and restriction unit makes the structure complicated, and the movable range of the blur prevention lens is not restricted with a high degree of reliability.

SUMMARY OF THE INVENTION

The present invention takes into consideration the above-noted problems and, accordingly, it is an object of the present invention to detect, with high precision, the position of the blur prevention lens using a simple and inexpensive structure.

It is another object of the present invention to provide a blur prevention device which can smoothly and stably drive the blur prevention lens in a desired drive direction with high precision.

It is a further object of the present invention to restrict the shift range of the blur prevention lens with high precision and high reliability using a simple and inexpensive structure.

Additional objects and advantages of the present invention will be set forth in part in the description which follows, and, in part, would be obvious in the description or may be learned by practice of the present invention.

The foregoing objects of the present invention are achieved by providing a blur prevention device having a movable blur prevention lens for the purpose of preventing image blur, first and second drive units which generate an amount of movement in first and second directions, respectively, first and second transfer units which transfer the respective amounts of movement of the first and second drive units to the blur prevention lens, and first and second transfer receiving units which receive the amounts of movement in the respective directions from the transfer units and which are provided on the blur prevention lens side in a state movable relative to the other one of the transfer units, a first guide which regulates the degree of freedom outside the movement in a specified direction of one of the first and second transfer units, and a second guide which is allowed a degree of freedom of movement outside the specified direction to the other transfer unit.

The above objects of the present invention may also be achieved by providing a blur prevention device having a movable blur prevention lens for the purpose of preventing image blur, first and second drive units which generate an amount of movement in first and second directions, respectively, first and second transfer units which transfer the amount of movement to the blur prevention lens, first and second transfer receiving units which receive the amount of movement in the first and second directions from the first and second transfer units, respectively, and are provided on the blur prevention lens side in states movable at approximate right angles to the first and second directions of the transfer units, and first and second adjustment units installed on the transfer receiving units, respectively, which can adjust an attachment position relationship between the respective transfer units and transfer receiving units.

Here, each of the first and second transfer receiving units are configured so as to receive the amount of movement in two places in relation to the transfer unit, and each adjustment unit may be configured so that at least one position of the two locations at which the respective transfer receiving unit receives the amount of movement can be modified in parallel with the direction of movement.

In addition, according to one aspect of the present invention, only one adjustment unit may be used, installed on the second transfer receiving unit, and which is capable of adjusting the attachment position relationship between the second transfer unit and the second transfer receiving unit.

Here, the second transfer receiving unit is configured such that the amount of movement in the second direction is received at two locations in relation to the second transfer unit, and the adjustment unit may be configured so that the position of at least one of the two locations at which the second transfer receiving unit receives the amount of movement can be modified in parallel to the second direction.

Also, according to another aspect of the present invention, the first transfer receiving unit and the first transfer unit are configured such that the amount of movement is transferred at multiple locations, and the second transfer receiving unit and the second transfer unit are configured so that the amount of movement is transferred at only one location.

According to embodiments of the present invention, if the blur prevention lens is provided with first and second drive units, first and second transfer units and first and second transfer receiving units, because one end of one of the transfer units is regulated in movement to outside a specified direction, but the other end is more or less given a degree of freedom, the excessive constraint conditions between the one transfer unit and the respective transfer receiving unit is relaxed, contact pressure in the contacting parts is stabilized, half strike and partial abrasion are avoided, the generation of unnecessary stress on the contact parts caused by an imbalance between the drive force transfer parts is prevented, and a smooth and stabilized drive can be obtained in the x axis and y axis directions.

Also, according to embodiments of the present invention, contact pressure between the parts can be stabilized because there are adjustment units installed which can adjust the attachment position relationship between each of the transfer receiving units and the respective transfer units, and smooth and stabilized drive is possible in their respective directions.

In addition, according to embodiments of the present invention, stabilized contact pressure can be obtained based on adjusting the number of transfer parts of one of the transfer receiving units and the respective transfer unit, and it is possible to avoid producing excessive constraint conditions.

Objects of the present invention may be further achieved with a blur prevention device having a blur prevention lens which is movable in a direction approximately at a right angle to the optical axis of a main optical system, a drive force generation unit which generates a drive force for the purpose of driving the blur prevention lens, a drive power transmission unit which transmits the drive power of the drive power generation unit to the blur prevention lens, and a restriction unit which restricts the movable range of the blur prevention lens to within a specified range. The drive power transmission unit includes a first speed reduction gear array which reduces the speed of rotation from a rotation drive source and a movement quantity generator mechanism which moves the blur prevention lens in a specified direction through the speed reduced rotational force. The restriction unit is connected to the first speed reduction gear array, but is separate from the movement quantity generation mechanism.

A second speed reduction gear array may be incorporated into the restriction unit, and the operating range of this second speed reduction gear array is configured so as to be mechanically restricted by a gear member mechanically limited to one rotation.

The action of the gear member, which is included in the second speed reduction gear array, and by which the rotation in the range of one rotation is mechanically restricted, is mechanically restricted such that the force that works on a shaft receiving part in a first restricted position of a first direction is weaker than the force which works on the shaft receiving part in a second restricted position of a second and opposite direction.

Moreover, the gear member may be electrically restricted to be within one rotation, thus limiting the operational range of the second speed reduction gear array.

Objects of the present invention are still further achieved by a blur prevention device having a blur prevention lens driven at high speed and with high accuracy, and it is desirable for the blur prevention lens to be arranged in a position in which the amount of movement is kept very small. For this reason, if, for example, the blur prevention lens is placed in a lens shutter camera, the blur prevention lens is generally arranged near the shutter part, and if there is an interchangeable lens, the blur prevention lens is arranged near the aperture part (in either case, the effective system is smaller than the other parts). Then, when arranging the blur prevention lens, it is convenient in terms of the assembly operation to make a single unit of the shutter (or the aperture) and the blur prevention device.

However, in order to reliably drive the blur prevention lens only an amount necessary and at a right angle direction to the optical axis, the blur prevention lens is to be positioned in a central position within a drivable range at a time of initiating the drive force. For this reason, when the blur prevention device is, for example, made into a single unit with the lens shutter, with the blur prevention lens being in the central position, it is necessary to accurately determine the positions of the blur prevention lens and the lens shutter in the direction of the optical axis and at a right angle direction to the optical axis. In particular, when a lens, which is configured in the photographic lens system, is part of a single unit with the shutter, unless the optical axis of the centrally positioned blur prevention lens agrees with the optical axis of the lens on the lens shutter side, there will be a negative influence on the optical performance of the photographic lens system. This kind of problem was not considered in Japanese Patent Publication No. 3-110530.

In order to achieve the above object, a blur prevention device may be provided with a first retention unit, which maintains a lens shutter or an aperture in a ready state, a second retention unit which retains a blur prevention lens in a state movable at a right angle direction to an optical axis, which also retains a drive mechanism, and which is attached to the first retention unit by adjusting the position at a right angle direction to the optical axis, an information output unit, which outputs information to drive the blur prevention lens to a central position within a drivable range, and first and second position adjustment units which adjust the position of the first and second retention units, respectively, relative to the direction orthogonal to the optical axis.

BRIEF DESCRIPTION OF THE DRAWINGS

These and other objects and advantages of the present invention will become apparent and more readily appreciated from the following description of the preferred embodiments, taken in conjunction with the accompanying drawings of which.

DESCRIPTION OF THE PREFERRED EMBODIMENTS

Figure 4:
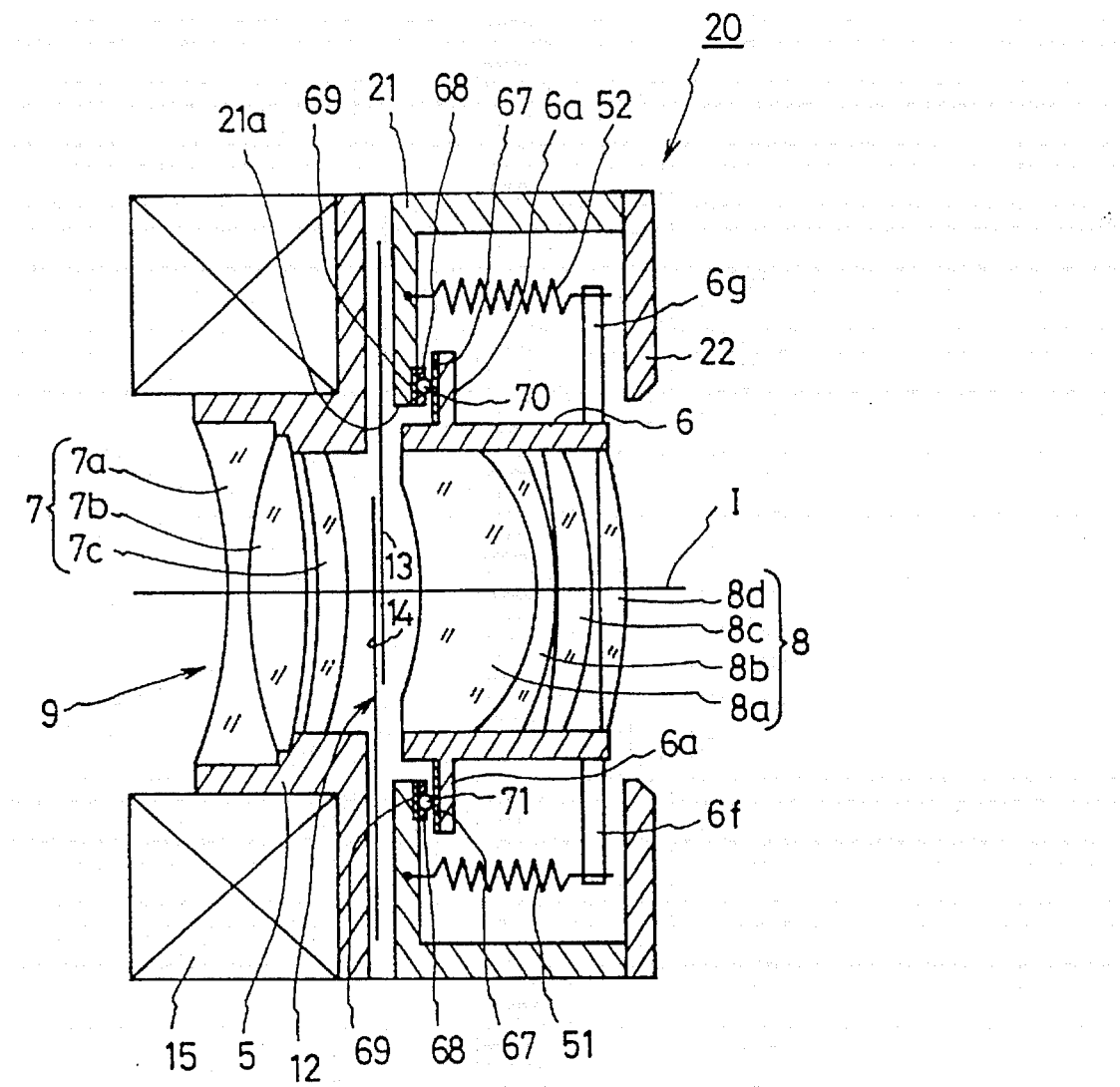
FIG. 4 is a cross-sectional diagram of the blur prevention device along the IV—IV line in FIG. 1.
Figure 5:
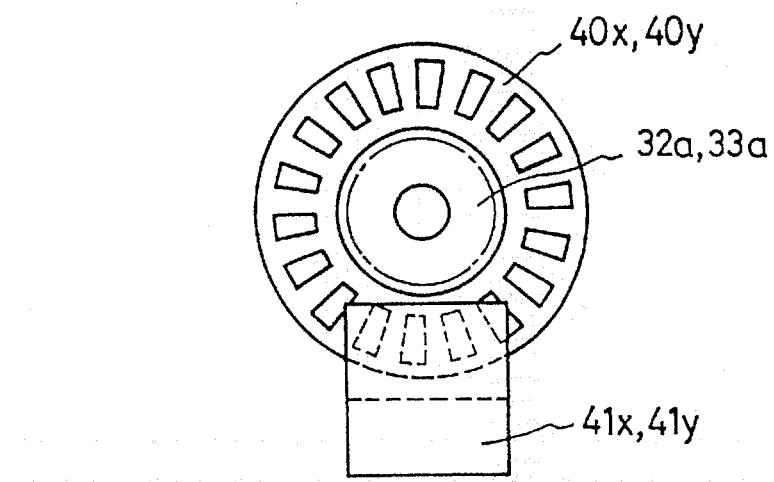
FIG. 5 is an expanded diagram showing a position detection unit of the blur prevention device of FIG. 1.
Figure 6:
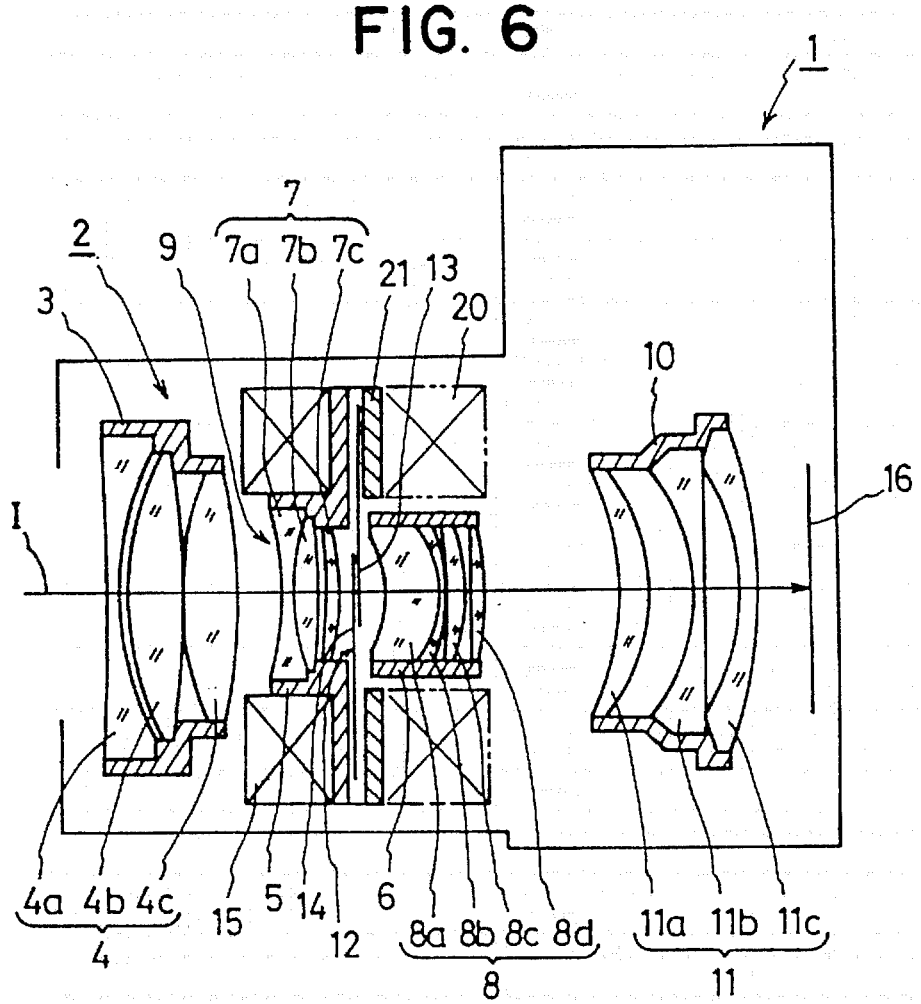
FIG. 6 is a cross-sectional diagram of a camera having a lens shutter using the blur prevention device of FIG. 1.

FIGS. 1 through 6 show a blur prevention device according to a first embodiment of the present invention. FIG. 6, in particular, illustrates a summary configuration of a camera having a photographic lens system with a lens shutter suitable for use in the present invention. Specifically, a camera 1 includes a photographic lens system 2, which is the main optical system and is a zoom lens, first lens group 4, second lens group 9 made up of pre- and post-lens groups 7 and 8, and third lens group 11.

Here, first lens group 4 comprises three lenses 4a, 4b and 4c, and is retained by lens frame 3. Second lens group 9 comprises a total of seven lenses: three lenses 7a, 7b and 7c retained by lens frame 5; and four lenses 8a, 8b, 8c and 8d retained by lens frame 6. Third lens group 11 comprises three lenses 11a, 11b and 11c, retained by lens frame 10.

Moreover, lens shutter 12 is configured to be between the pre- and post-lens groups 7 and 8 of the second lens group 9, and comprises shutter curtains 13 and 14 and drive part 15 which drives them. In addition, drive part 15 is arranged in the peripheral part of lens frame 5 of pre-lens group 7 in second lens group 9, and also, shutter curtains 13 and 14 are arranged immediately before post-lens group 8 which functions as the blur prevention lens.

In addition, in FIG. 6, reference numeral 16 denotes a focal plane for the film on which the subject image is focused by first, second, and third lens groups 4, 9 and 11 which form photographic lens system 2. I is the optical axis of photographic lens system 2.

Figure 2A:
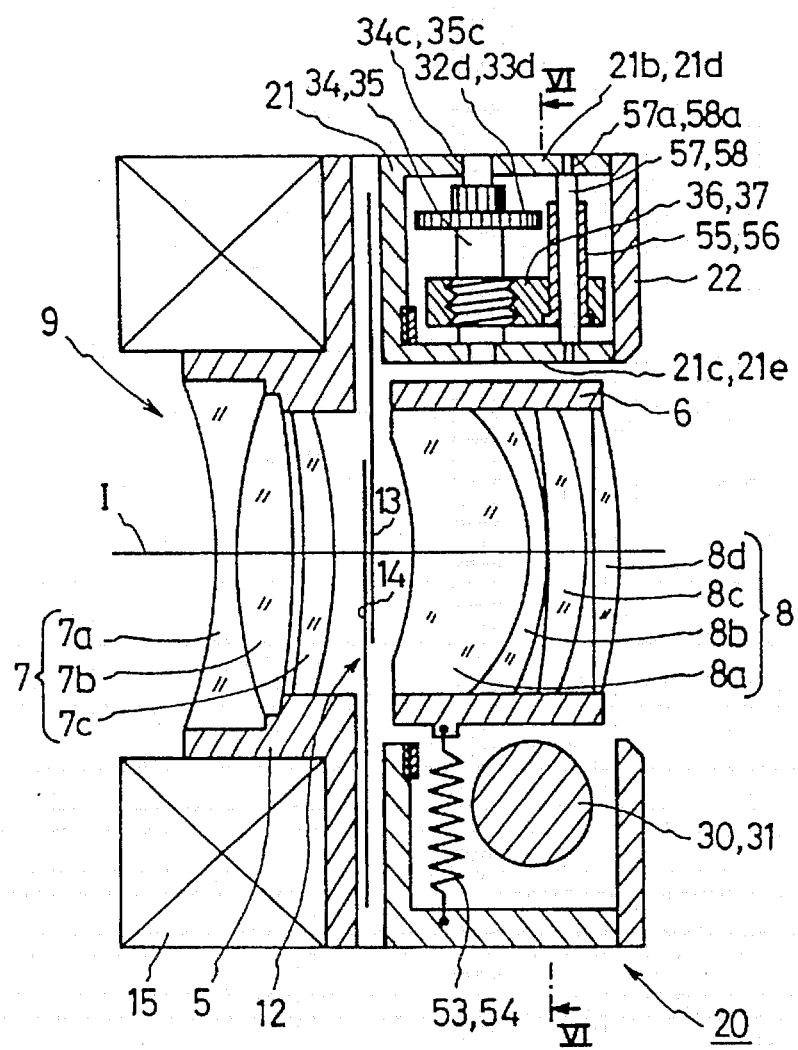
FIG. 2A is a cross-sectional diagram of the blur prevention device along the I—I line in FIG. 1, and FIGS. 2B and 2C are summary diagrams seen from the arrows IIa and IIb in FIG. 1, respectively.
Figure 3:
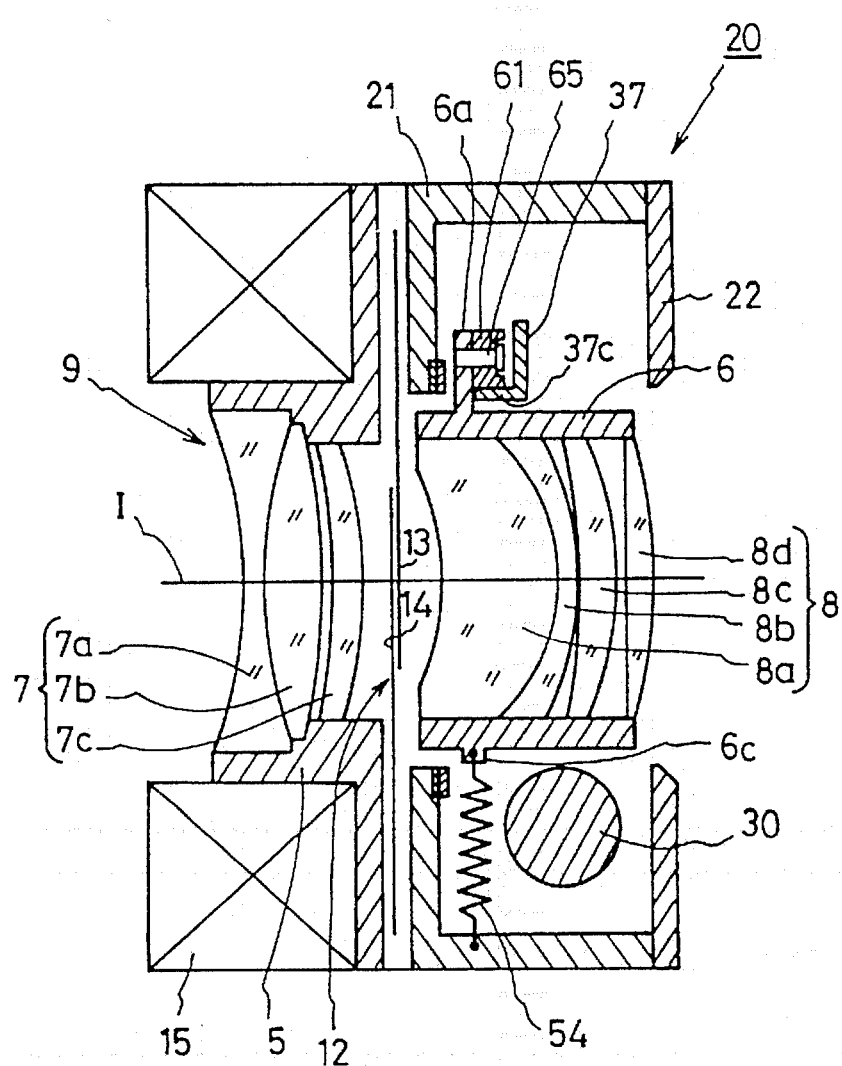
FIG. 3 is a cross-sectional diagram of the blur prevention device along the III—III line in FIG. 1.

According to the first embodiment, in photographic lens system 2 which has the previously described three lens groups 4, 9 and 11, post-lens group 8 of second lens group 9 performs the function of the blur prevention lens so as to move the image focused on focal plane 16 corresponding to the image blur state by using the kind of image blur prevention mechanism 20 shown in FIGS. 2A, 3 and 4, by shifting in a direction orthogonal to optical axis I.

This kind of image blur prevention mechanism 20 side at the 21 on the lens shutter 12 side at the periphery of post-lens group 8 of second lens group 9, as shown in FIGS. 1 through 4 and 6. Post-lens group 8 (hereinafter called "blur prevention lens") of second lens group 9 is secured and retained within lens frame 6, as shown in FIGS. 1 through 4. Moreover, flange part 6a is provided in the part opposing the opening part 21a of base 21 at the periphery of lens frame 6, as shown in FIG. 4.

Figure 1:
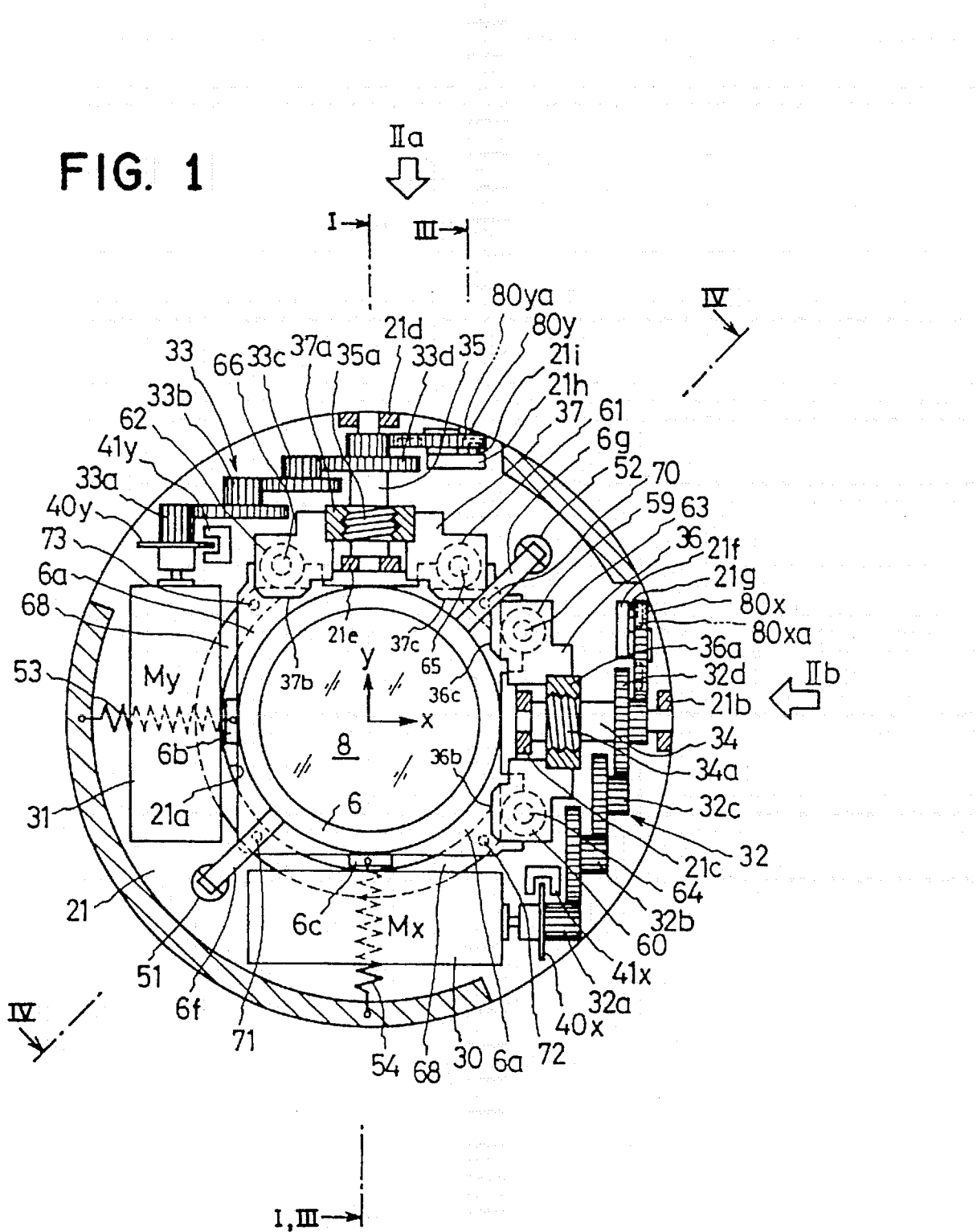
FIG. 1 is a cross-sectional diagram of a blur prevention device in a lens barrel part of a camera according to a first embodiment of the present invention.

Receiving members 67 and 69, made from hardened material such as quenched steel, for the purpose of receiving ball bearings 70, 71, 72 and 73 which are positionally determined and retained by through holes in retainer member 68, are attached in the area where flange part 6a and base opening part 21a oppose each other, as shown in FIGS. 1 and 4. Ball bearings 70, 71, 72 and 73 are retained in a state of being enclosed between these receiving members 67 and 69, and by this, lens frame 6 is in a movable state in relation to opening part 21a of base 21 through flange part 6a, receiving member 67, and ball bearings 70 through 73.

Specifically, through holes, by which ball bearings 70, 71, 72 and 73 are retained so that they can freely rotate within, are formed in retainer member 68 and arranged equally spaced around the periphery of lens frame 6. Moreover, springs 51 and 52 are hung between base 21 and arm parts 6f and 6g provided on the periphery of lens frame 6, and by doing this, receiving members 67 and 69 are held in constant contact with ball bearings 70 through 73.

With this kind of structure, blur prevention lens 8 is retained so that it can move with low load within a plane at a right angle to optical axis I. Moreover, because of the constant force from springs 51 and 52, there is no problem with deterioration of optical performance produced by tilting. In addition, in FIG. 4, ball bearings 70 and 71 are indicated only in two places, but as shown in FIG. 1, ball bearings, including 72 and 73, may be arranged in four places between opening part 21a of base 21 and flange part 6a.

In FIG. 1, DC motors 30 and 31 (Mx, My are added in the diagram), for the x axis and the y axis, comprise the drive unit for the purpose of moving blur prevention lens 8 in the x axis direction and the y axis direction. They are installed and secured on the base 21 side. Moreover, speed reduction gear arrays 32 and 33 are rotation transfer units comprising gears 32a, 32b, 32c and 32d; and 33a, 33b, 33c and 33d, which transmit the drive force from first and second motors 30 and 31; and this rotation is transmitted to first and second shafts 34 and 35. First and second shafts 34 and 35 extend in the x axis direction and the y axis direction, respectively, and are supported so that they can rotate in shaft support parts 21b, 21c and 21d, 21e, respectively, which are provided on base 21.

In addition, gears 32b, 32c and 33b, 33c, which form part of gear arrays 32 and 33 that transmit the rotation from DC motors 30 and 31, are respectively secured so that they can move on base 21, and gears 32d and 33d are configured so that they can rotate as a single body with shafts 34 and 35, respectively.

Movable members 36 and 37 are the transfer units of the x axis side and the y axis side, respectively, and female screw parts 36a and 37a, provided on them, respectively, mesh with male screw parts 34a and 35a of corresponding shafts 34 and 35. The movement quantity generation mechanism for the purpose of moving lens frame 6 in the directions of the x and y axes through movable members 36 and 37 is configured by the transmission screw mechanisms based on movable members 36 and 37.

As shown in FIG. 2A, guide members 55 and 56 are secured to these movable members 36 and 37 near female screw parts 36a and 37a, respectively. The guide members 55 and 56 are guided by guide shafts 57 and 58 which are secured in parallel to shafts 34 and 35 by shaft receiving parts 21b, 21d and 21c, 21e, respectively, of base 21. Consequently, movable members 36 and 37 can be moved in the direction of the x axis or the direction of the y axis by motors 30 and 31, respectively.

Figure 2B:
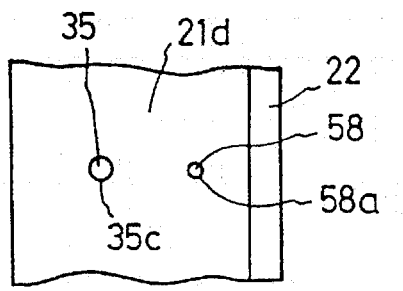
Figure 2C:
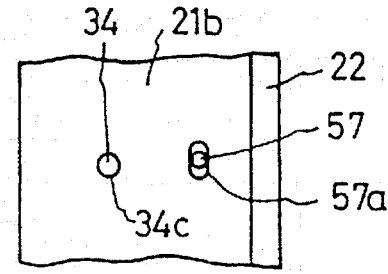

Here, the installation of guide shafts 57 and 58 are installed with differing methods, as is clearly shown in FIGS. 2A, 2B and 2C.

Specifically, guide shaft 58 (in the present embodiment, the guide shaft on the y axis side) is securely fixed in an immobile state on shaft receiving parts 21d and 21e of base 21 using shaft holes 35c and 58a.

Guide shaft 57 (in the present embodiment, the x axis side) is supported by constraining the attachment position in relation to shaft receiving part 21c of base 21 by shaft hole 34a, but not constraining the position in relation to shaft receiving part 21b by long hole 57a, and is installed in a state movable in the circumferential direction.

This is for the purpose of allowing rollers 59, 60, and 61, 62, which are installed on flange part 6a of lens frame 6, as will be described later, to contact and become seated at four points on movable members 36 and 37, and by this, excessive constraint can be avoided.

If guide shaft 57 were supported to be securely fixed in relation to base 21 as is guide shaft 58, the angular relationships of movable members 36 and 37 would be fixed. Then, in this kind of situation, when considering the differences in part dimensions of movable members 36 and 37, rollers 59, 60 and 61, 62, and flange part 6a in lens frame 6, it could not be guaranteed that the contact parts at the four places of rollers 59, 60 and 61, 62 would all contact and seat properly with movable members 36 and 37.

In other words, the above-described embodiment of the present invention is a device which prevents this kind of excessive constraint from arising by the state of contact between movable members 36 and 37 with rollers 59, 60 and 61, 62. Because the relationship between lens frame 6 and movable members 36 and 37 is corrected as described above, the installation of guide shaft 57 on the movable member 36 side of one direction has the results described above.

Here, as is clearly shown in FIGS. 1 and 3, rollers 59, 60, 61 and 62 are installed so as to freely rotate on flange part 6a of lens frame 6 using roller shafts 63, 64, 65 and 66, respectively. In addition, springs 53 and 54 are hung between base 21 and spring hanger part 6b opposite rollers 59 and 60 of lens frame 6 and between base 21 and spring hanger part 6c opposite rollers 61 and 62, in directions that are approximately parallel to the x axis and y axis directions of the movable directions of movable members 36 and 37, respectively. Thus, rollers 59, 60 and 61, 62 are brought into contact with contact parts 36b and 36c or 37b and 37c, each having an L shaped cross-section, on both ends of movable members 36 and 37, respectively, due to the resilient force from springs 53 and 54.

In addition, as described above, due to the particular installation of guide shafts 57 and 58, rollers 59, 60 and 61, 62 have stabilized contact pressure with contact parts 36b, 36c and 37b, 37c, respectively, of movable members 36 and 37 and, therefore, the problem of half strike is avoided, and unnecessary stress on the parts, caused by an increase in the amount of partial abrasion and roller force on the rollers and an imbalance of the drive force transfer parts, can be prevented.

It is possible to have high precision drive that is smooth and stable in the x axis and y axis drive directions. In addition, by firmly securing one guide shaft 58 in relation to base 21, rollers 61 and 62 are made to rotate stably in relation to contact parts 37b and 37c, respectively, of movable member 37, and because the force of spring 54 works on lens frame 6, instability in the drive direction of the y axis does not occur.

Consequently, blur prevention lens 8 shifts in the movable direction (x axis direction) of movable member 36 based on the rotation of motor 30 of the x axis side, but is free to move in the y axis direction. Also, in the same way, this blur prevention lens 8 shifts in the movable direction (y axis direction) of movable member 37 based on the rotation of motor 31 of the y axis side, but is free to move in the x axis direction. Because of this, this blur prevention lens 8 can shift in all directions within opening part 21a of base 21.

Also, lens frame 6 and movable members 36 and 37 are always in contact because lens frame 6 is forced by springs 53 and 54 in about the same direction as the x axis direction and y axis direction, which are the movable directions of movable members 36 and 37, respectively, and it is possible to reliably transmit the motion of movable members 36 and 37 to lens frame 6.

Furthermore, the thrust play of shafts 34 and 35, and the interaction between the male screw parts 34a and 35a of shafts 34 and 35 and the fastening parts of female screw parts 36a and 37a of movable members 36 and 37, respectively, can always be taken up by the force of springs 53 and 54. Consequently, the drive forces of the respective motors 30 and 31 can be reliably and accurately transmitted to blur prevention lens 8.

Thus, in the first embodiment, by substituting movable support for lens frame 6 based on movable members 36 and 37 through rollers 59 through 62 at four places as described above, there are advantages to installing one end or the other of guide shaft 57 such that the attachment position is constrained in relation to shaft receiving part 21c of base 21, but is not constrained in relation to shaft receiving part 21b.

Specifically, in this kind of configuration, there is an immobile combination of movable member 37, which is supported by guide shaft 58 that is in a completely fixed state, and lens frame 6 through rollers 61 and 62, but the other guide shaft 57 is movable and has a degree of freedom in rollers 59 and 60 on its side, and therefore the constraint conditions caused by rollers 59 through 62 at four locations can be relaxed between lens frame 6 and movable members 36 and 37. That is, because movable member 36 can oscillate to a certain degree from guide shaft 57, excessive constraint is eliminated, and contact with proper seating is accomplished at four points.

Figure 7A:
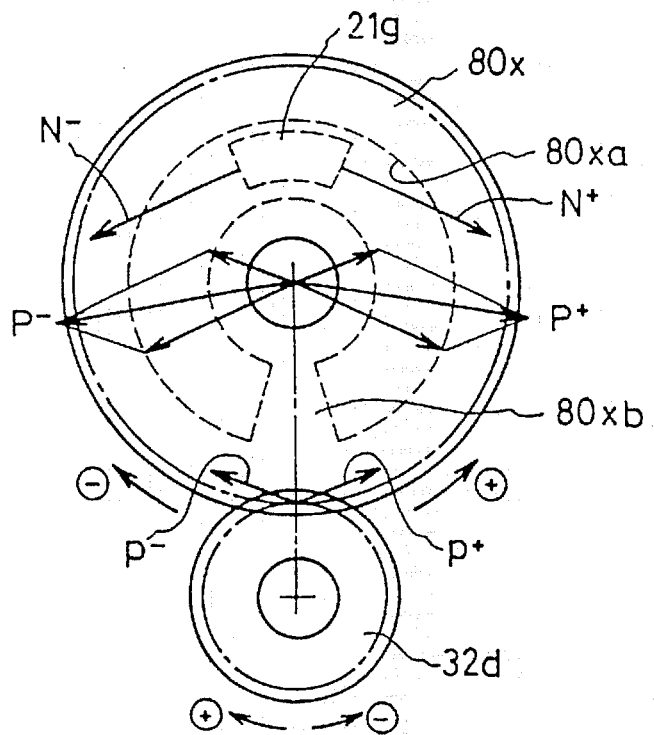
FIGS. 7A and 7B are diagrams showing restriction units that restrict the movable range of the blur prevention lens as seen from IIa and IIb views indicated by the arrows in FIG. 1, respectively.
Figure 7B:
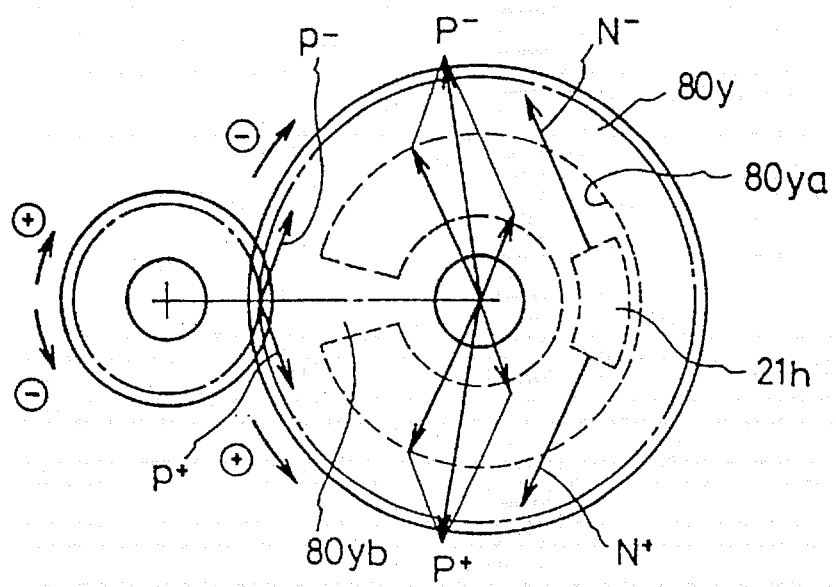

As shown in FIGS. 1, 7A and 7B, restriction gears 80x and 80y are provided in the drive force transfer unit which is for the purpose of being able to move lens frame 6 through all the parts from motors 30 and 31 to movable members 36 and 37, and they mesh with gears 32d and 33d which make up one part of speed reduction gear arrays 32 and 33, respectively. Restriction gears 80x and 80y restrict the drive force transfer in the transfer system to be within a fixed range, and are supported so that they can freely rotate in shaft receiving parts 21f and 21h, respectively, that are provided on base 21.

Restriction gears 80x and 80y have a special use as parts of the restriction units in the embodiment of the present invention, and their operation will be explained below using FIGS. 7A and 7B. Here, FIG. 7A is a view as seen from the arrow IIa in FIG. 1, and indicates the relationship between gear 32d of the x axis and restriction gear 80x. Also, FIG. 7B is a view as seen from the arrow IIb in FIG. 1, and indicates the relationship between gear 33d of the y axis and restriction gear 80y.

Here, the restriction of rotation is executed by roughly C shaped grooves 80xa and 80ya that are hollowed into the backside of gears 80x and 80y (on the movable members 36 and 37 side in FIG. 1), and by convex parts 21g and 21i that protrude from gear shaft receiving parts 21f and 21h and which fit into grooves 80xa and 80ya, respectively. Consequently, restriction gears 80x and 80y cannot rotate 180 degrees in either direction because rib parts 80xb and 80yb of restriction gears 80x and 80y contact convex parts 21g and 21i.

Here, as indicated in FIGS. 7A and 7B, with convex parts 21g and 21i positioned in the center of grooves 80xa and 80ya of restriction gears 80x and 80y, respectively, blur prevention lens 8 is positioned in the center (positioned so that the optical axis of blur prevention lens 8 and optical axis I agree), and by configuring the rotational angle of restriction gears 80x and 80y to match the amount of shift of blur prevention lens 8, the amount of shift of blur prevention 8 can be restricted within a specified range. When rotation is restricted, motors 30 and 31 are stopped, and if that state is maintained a fixed time, the motors may be controlled by the power source going OFF.

Because the rotation of restriction gears 80x and 80y is mechanically restricted, this configuration is effective in situations where overrun problems arise in electric control systems. The position and speed detection method for this kind of blur prevention lens 8 is explained below.

Also, in FIGS. 1 and 5, circular plates 40x and 40y are provided as single units with gears 32a and 33a, and have numerous holes provided on the peripheral area thereof at equal intervals. Photo interrupters 41x and 41y enclose the peripheral areas of circular plates 40x and 40y, and are provided on the base 21 side. Photo interrupters 41x and 41y detect the number of holes on the circular plates 40x and 40y as pulse signals, and by counting these pulse signals, the movement of motors 30 and 31, as well as the position and speed of blur prevention lens 8, can be detected.

With this kind of position detection, for example, if gears 32d and 33d are rotated in the "−" arrow direction in FIGS. 7A and 7B, blur prevention lens 8 shifts to the left downward direction of FIG. 1 and reaches a restricted position. The position is detected by using this position as the base point, and pulses are counted by photo interrupters 41x and 41y. In addition, the speed is detected by the speed of the pulses.

Consequently, because encoders comprising circular plates 40x and 40y with holes and photo interrupters 41x and 41y are provided on the output shafts of motors 30 and 31, and because restriction gears 80x and 80y are provided through the speed reduction gear arrays, the operational restriction positions of restriction gears 80x and 80y, as well as the operational angles, can be detected with high resolution.

Furthermore, by making the operational rotation angles of restriction gears 80x and 80y to be angles smaller than 360 degrees, the shift range of blur prevention lens 8 can be restricted to the specified range by one restriction gear each.

Because blur prevention lens 8 is driven through transport screw mechanisms that are movement quantity generation mechanisms separate from restriction gears 80x and 80y, no direct load is placed on blur prevention lens 8, and blur prevention lens 8 can be restricted to the specified range with high precision.

In this kind of configuration, the operational force placed on shafts 34 and 35 of speed reduction gear systems 32 and 33 and their respective shaft receiving pans, and also the force placed on the shafts and shaft receiving parts of restriction gears 80x and 8y by all the drive force transmission mechanism parts from motors 30 and 31 up to lens frame 6, is kept to a minimum, and problems such as unnecessary rattling and eventual abrasion can be prevented. In addition, when restriction gears 80x and 80y are provided in this way and are configured so as to restrict rotation within one rotation, there is the advantage that the gear ratio in speed reduction gear arrays 32 and 33, and the degree of freedom of the lead angle and the transport screw mechanism (movement quantity generation mechanism) can be increased.

In addition, in this embodiment, there is a mechanism to transfer the drive force from motors 30 and 31 to movable members 36 and 37 through a screw mechanism, but a mechanism that converts rotational movement to linear movement without using a screw mechanism, for example, a cam mechanism or a mechanism using levers or belts, etc. may also be applied.

Also, in the embodiment described above, restriction gears 80x and 80y are meshed with the final gears 32d and 33d of speed reduction gear arrays 32 and 33 in the drive force transmission mechanism, but they could, of course, be connected at any position in the gear arrays. In this case, when connected to a gear near the end of the gear array, it is advantageous from the point of view of speed reduction gear ratios.

With image blur prevention mechanism 20 configured as above, blur prevention lens (post-lens group) 8 of second lens group 9 can be shifted in any direction at a right angle to lens optical axis I, the image focused on focal plane 16 being moved under the required conditions, and as a result, image blur can be prevented.

Also, according to image blur prevention mechanism 20 described above, it is possible to arrange DC motors 30 and 31, which have relatively large volumes, such that their long directions have a positional relationship that is at right angles to optical axis I of the photographic lens group 2, and as shown in FIGS. 2 and 3, it is not necessary to have the DC motors 30 and 31 stick out from the optical axis I further than lens shutter 12 and the third lens group 11, and there is the advantage in terms of structure and assembly that the motors 30 and 31 can be incorporated compactly and with high density as a unit at the periphery of lens frame 6 of blur prevention lens 8.

Consequently, according to this kind of image blur prevention mechanism 20, the space of lens shutter 12 and the interval between second lens group 9 and third lens group 11 are not inhibited. Moreover, because this mechanism can be easily made into a unit, it is superior with regard to packaging properties, and is extremely advantageous, when for example, arranged in the vicinity of the aperture mechanism in interchangeable type photographic lenses.

Thus, in the configuration described above, first and second DC motors 30 and 31 are within the volume of space extending radially from lens frame 6 of blur prevention lens 8. Their respective long directions are arranged in a position that is shifted to the periphery along with first and second movable members 36 and 37 that are positioned within this volume of space so that first and second movable members 36 and 37 can move, such that the positional relationships are at right angles with optical axis I. Because of this configuration, there are advantages in that DC motors 30 and 31, which form the drive unit, can be arranged without protruding beyond the volume of space extending radially from the lens frame 6. Thus, the blur prevention mechanism 20 can be configured as a single unit based on these conditions, and space for the blur prevention mechanism 20 can be economized and costs reduced.

This kind of advantage can be enhanced by configuring the output shafts of motors 30 and 31 such that they are respectively arranged in the x axis direction and y axis directions, and their rotational forces are converted to linear motion in the x axis direction and the y axis direction through respective gear arrays 32 and 33 based on respective first and second shafts 34 and 35, which are the first and second conversion units, and on first and second movable members 36 and 37.

In addition, blur prevention mechanism 20 is a unit within the space extending radially lens frame 6 of blur prevention lens 8, using the case member comprising base 21 and disk 22. The size of blur prevention mechanism 20 is also compact, and the effectiveness of this feature can be manifest by using other complicated mechanisms such as lens shutter 12 in part positions that require close arrangement, as shown in FIG. 6.

Figure 8A:
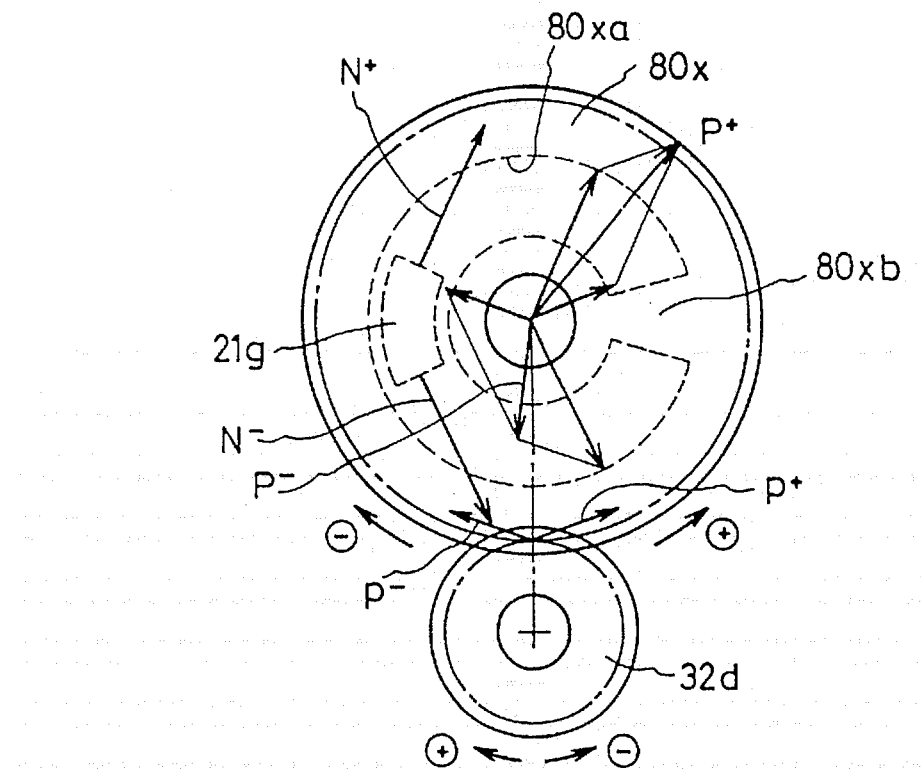
FIGS. 8A and 8B are diagrams showing restriction units that restrict the movable range of a blur prevention lens, corresponding to FIGS. 2A and 2B, respectively, according to a second embodiment of the present invention.
Figure 8B:
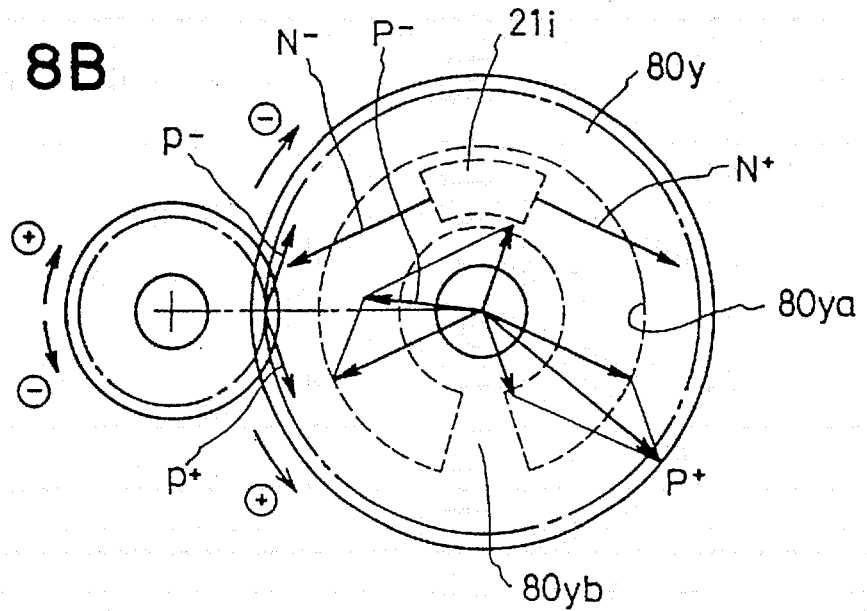

FIGS. 8A and 8B show a second embodiment of a blur prevention device related to the present invention, and in this embodiment, the position of convex parts 21g and 21i of corresponding gear shaft receiving parts 21f and 21h, which restrict the rotation of restriction gears 80x and 80y, have been modified.

In these diagrams, when gears 32d and 33d rotate in the "+" and "−" directions indicated by the arrows, the shafts of restriction gears 80x and 80y receive the combined force P+ and P− of the drive force p+ and p− of gears 32d and 33d in a first restricted position and the opposite force N+ and N− of convex parts 21g and 21i of corresponding shaft receiving parts 21f and 21h in a second restricted position.

Consequently, as indicated by FIGS. 8A and 8B, by modifying the position of convex parts 21g and 21i of restriction gears 80x and 80y, the force on the shafts of restriction gears 80x and 80y in the restricted positions become P+ and P−, and when gears 32d and 33d rotate in the direction of the "−" arrow, the force which the shafts of restriction gears 80x and 80y receive in the restricted position can be made small.

Thus, when detecting the position of blur prevention lens 8, by taking the restriction position at which gears 32d and 33d have been rotated in the "−" arrow direction to be the base point of position detection, the force that works on restriction gears 80x and 80y at the restriction position can be lightened, and damage to the shafts can be prevented. Specifically, when using as the base point the restriction position of a side which has a smaller acting force on the gear shafts and shaft receiving parts, the other side is hardly used at all. Consequently, the force on the shafts and the shaft receiving parts is minimized, and this is superior in terms of reliability and durability during operation.

Figure 9A:
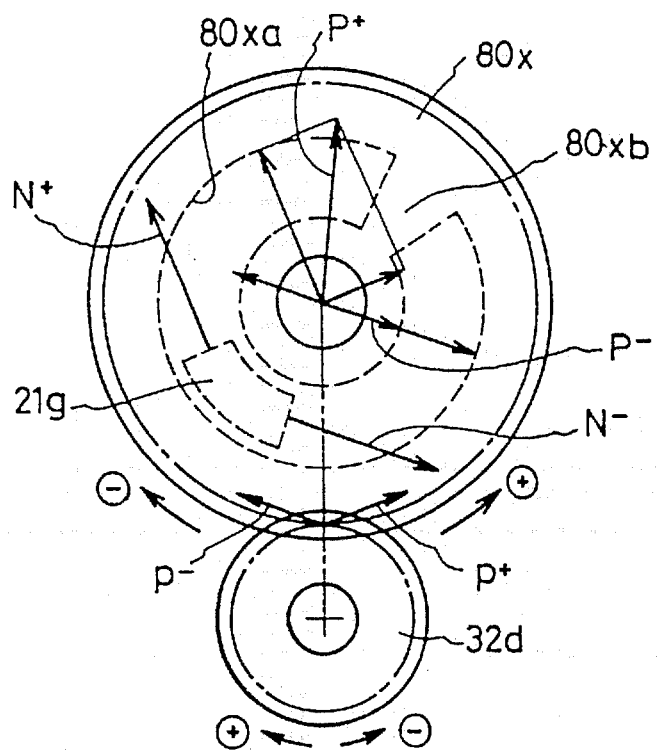
FIGS. 9A and 9B are diagrams showing restriction units which restrict the movable range of a blur prevention lens, corresponding to FIGS. 7A through 8B, according to a third embodiment of the present invention.
Figure 9B:
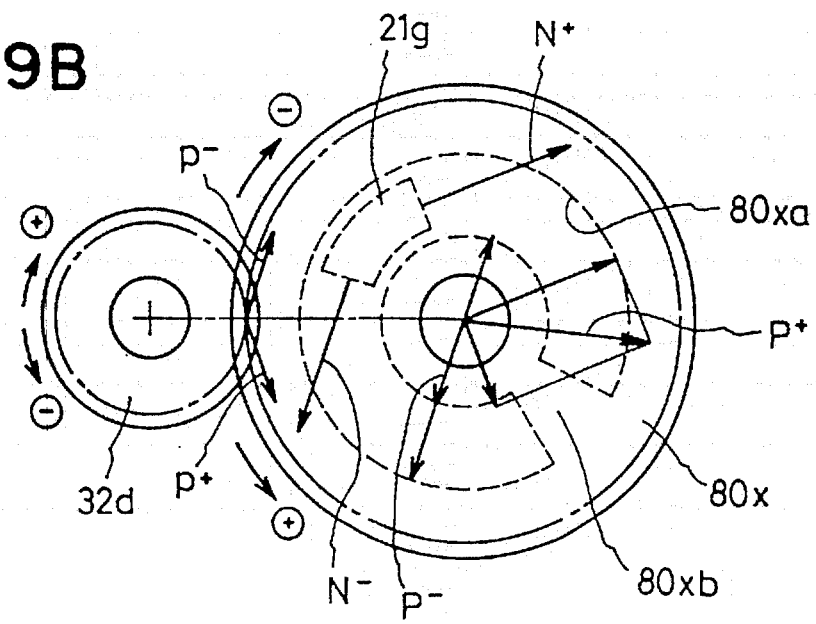

FIGS. 9A and 9B show a modified example of the embodiments of FIGS. 7A through 8B, and are according to a third embodiment of the present invention. In these diagrams, the positions of convex parts 21g and 21i, which restrict the rotation of restriction gears 80x and 80y described above, are made to face opposite drive force p− of gear 32d and opposite force N− of convex parts 21g and 21i (position of 180 degrees).

Because the force which works on the shafts and shaft receiving parts can be made to be minimal in the restriction position which has been rotated in the "−" direction, the force working on the shafts is reduced to the lowest limit, and the effect upon the shafts, etc., can be minimized.

Figure 10A:
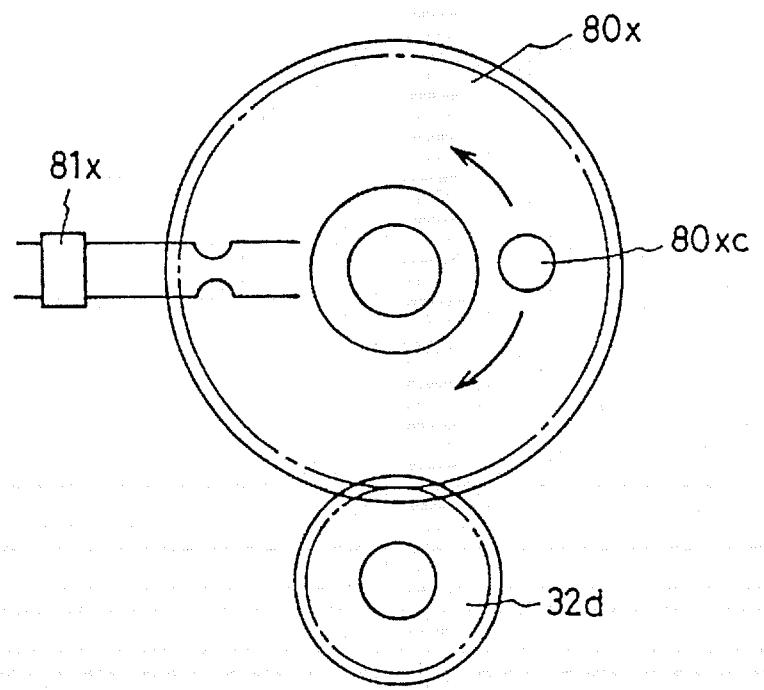
FIGS. 10A and 10B are diagrams showing restriction units which restrict the movable range of a blur prevention lens, corresponding to FIGS. 7A through 9B, according to a fourth embodiment of the present invention.
Figure 10B:
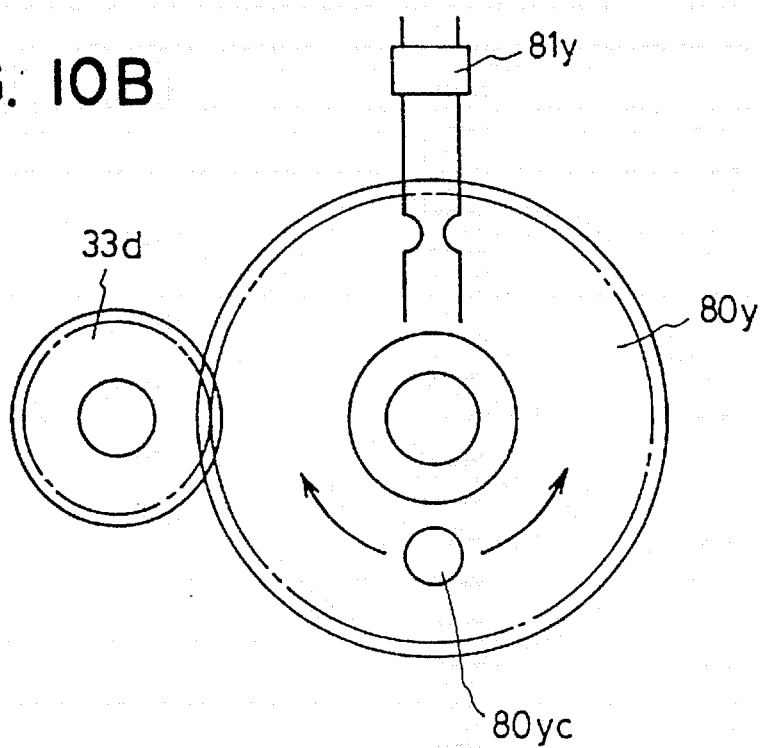

FIGS. 10A and 10B show a modified example that differs from the embodiments of FIGS. 7A through 9B, and are according to a fourth embodiment of the present invention. That is, the rotation of restriction gears 80x and 80y is restricted by electric signals.

Specifically, bosses 80xc and 80yc are provided in positions that are eccentric to restriction gears 80x and 80y, respectively, and switches 81x and 81y, which have contact pieces positioned in the movable ranges of bosses 80xc and 80yc, respectively, are secured to base 21.

When restriction gears 80x and 80y rotate in their respective directions, bosses 80xc and 80yc press on the contact pieces of switches 81x and 81y, respectively, switching them ON, the rotation of motors 30 and 31 is terminated, and present positions are taken to be the restricted positions. Thus, by detecting the operation restriction positions of restriction gears 80x and 80y by switches 81x and 81y, respectively, reliability can be further improved.

In addition, the present invention is not limited to the structures for the embodiments described above, and the shape and structure, etc., of each part that forms the blur prevention device, starting with image blur prevention mechanism 20, can be suitably transformed and modified.

For example, in the embodiments described above, gear members 80x and 80y are used in the speed reduction gear arrays 32 and 33, which are the drive power transmission units from the drive power generation units (motors 30 and 31). The screw mechanisms (34a, 35a, 36a, 37a) are used as the movement quantity generation mechanisms and are separate from the gear members 80x and 80y. But, the present invention is not limited to this. Specifically, without being limited to the gear members described above as the restriction units, mechanism structures using gear mechanisms, or cams and racks, may also be used.

In addition, in the embodiments described above, grooves are provided on restriction gears 80x and 80y, and convex parts are provided on the shaft receiving side. However, because these relationships can be appropriately modified, a variety of shapes are possible.

Also, the blur prevention device in the embodiments described above is applied to a camera having a lens shutter 12, but it is not limited to this, and may be used in blur prevention lenses which shift in a direction at right angles to optical axis I in order to prevent image blur caused by hand vibration in other widely known cameras. Also, the present invention is not limited to camera structures, but can be used in other optical devices, instruments and equipment.

Figure 11:
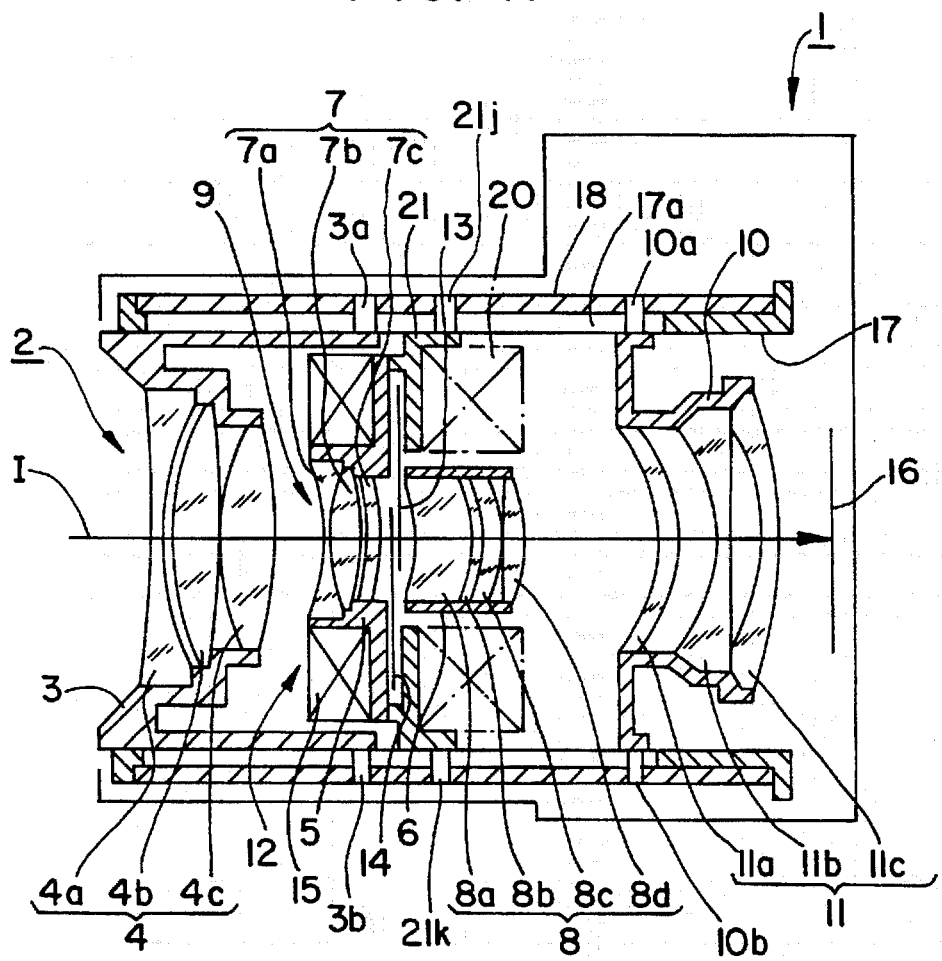
FIG. 11 is a cross-sectional diagram of a camera having a zoom lens using a blur prevention device, according to a fifth embodiment of the present invention.

FIG. 11 shows a blur prevention device according to a fifth embodiment of the present invention. Linear advance guide barrel 17 is fixed to a camera body and linear advance grooves 17a in the direction of multiple optical axes are formed on linear advance guide barrel 17. Zoom cam barrel 18 is inserted so that it can turn on the outer surface of guide barrel 17, and multiple cam grooves (not indicated in the diagram), which correspond to linear grooves 17a, are formed on cam barrel 18. The photographic lens system includes a zoom lens comprising first lens group 4, second lens group 9, and third lens group 11. Cam followers 3a, 3b and 10a, 10b are installed on the outer surface.

Lens shutter 12 comprises shutter curtains 13 and 14, which are mounted between pre-lens group 7 and post-lens group 8. Cam followers 21j and 21k, which are formed on the exterior surface of base 21, are related to the cam grooves of cam barrel 18 through linear advance grooves 17a of linear advance guide barrel 17. As will be described in detail later, lens frame 5 and base 21 are made into a single body using machine screws.

In FIG. 11 when cam barrel 18 is rotated, because its cam grooves move, all of the cam followers 3a, 3b, 10a, 10b, 21j, and 21k are driven in the direction of the optical axis guided by the linear advance grooves 17a of linear advance guide barrel 17. As a result, first lens group 4 and third lens group 11, which are supported by lens frames 3 and 10, respectively, and second lens group 9, which is retained by base 21, are moved in the direction of the optical axis, and zooming by photographic lens group 2 is performed.

Figure 12:
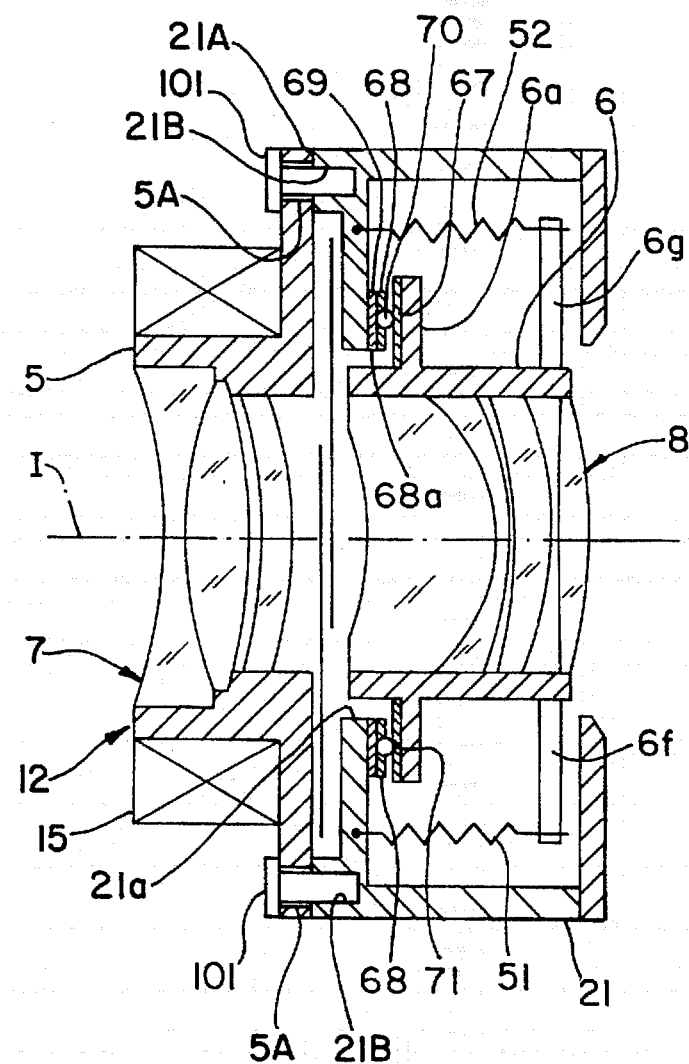
FIG. 12 is a cross-sectional diagram of the blur prevention device along the IV—IV line of FIG. 1 in a camera of FIG. 11.

Moreover, in FIG. 12, multiple through holes 5A, throughout which machine screws 101 pass, are formed in lens frame 5, and screw holes 21B into which machine screws 101 are fastened, are formed in projecting part 21A that is formed on the surface of base 21 shown on the left side of the diagram.

Figure 13:
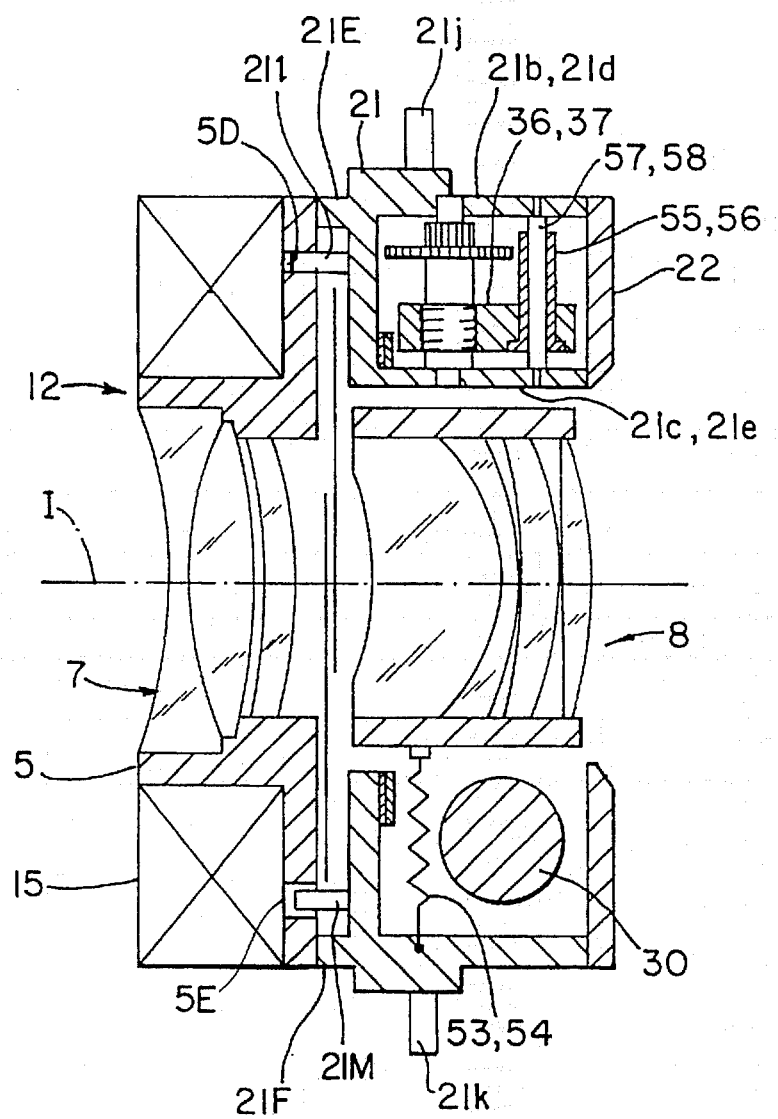
FIG. 13 is a cross-sectional diagram of the blur prevention device along the I—I line in FIG. 1 as installed in a camera of FIG. 11, showing a first type of structure to set a relative position of a base with respect to a lens frame.

In FIG. 13, bosses 21L and 21M are arranged on the base 21, in order to set the relative position of the base 21 with respect to the lens frame 5. A hole 5D and a slotted hole 5E are disposed in the lens frame 5, corresponding to the bosses 21L and 21M. The relative position is set in this manner. In this type of structure, the relative position has been set by two fixed bosses, but the position may be set by other types of structures. For example, the bosses 21L and 21M may be provided on the lens frame 5 and the hole 5D and slotted hole 5E may be provided in the base 21.

Figure 14:
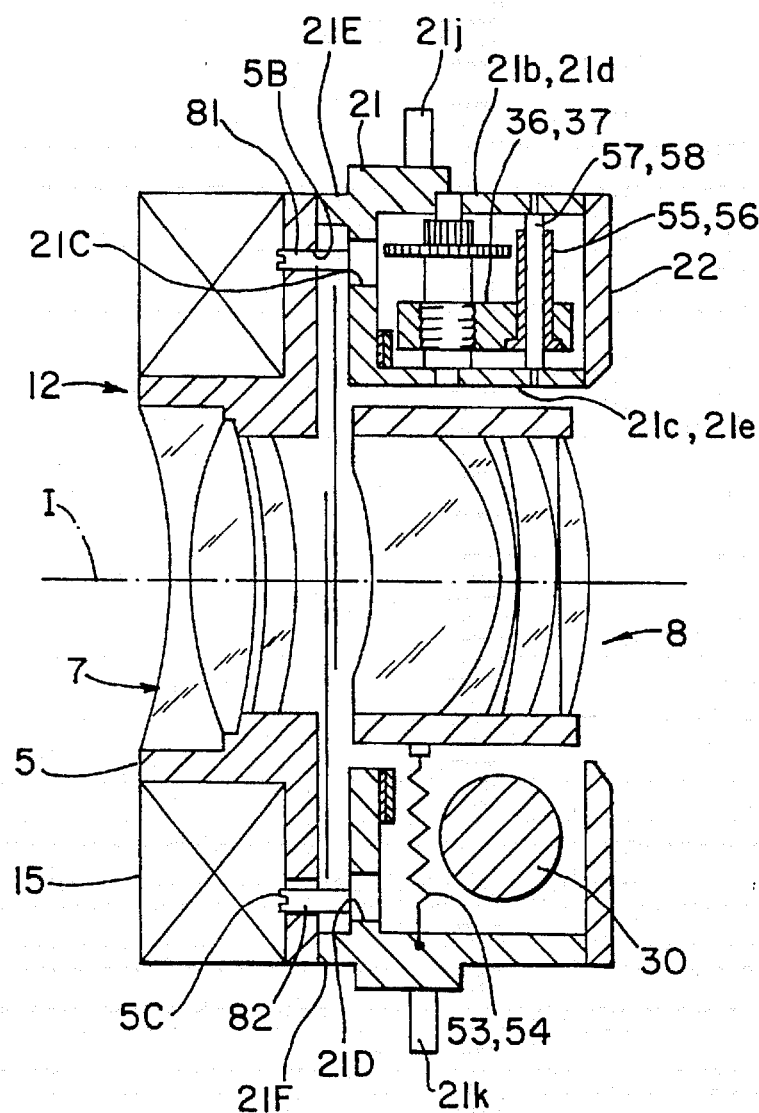
FIG. 14 is a cross-sectional diagram of the blur prevention device along the I—I line in FIG. 1 as installed in a camera of FIG. 11, showing a second type of structure to set the relative position of the base with respect to the lens frame.

FIG. 14, shows a second type of such a structure which adjusts the relative position of the base 21 with respect to the lens frame 5 by using eccentric pins 81 and 82. Eccentric pins 81 and 82 are for position adjustment and the head parts thereof are inserted so that they can rotate in hole parts 21C and 21D of base 21. The shaft parts of eccentric pins 81 and 82 pass through hole 5B and long hole 5C, respectively, which are formed in lens frame 5. Positional adjustment will be described in detail later.

As shown in FIG. 5, based on photo interrupters 41x and 41y, the number of holes on the circular plates 40x and 40y are detected as pulse signals. By counting them, the rotational angle of motors 30 and 31 on the x-axis and y-axis side are detected, and the position and speed of blur prevention lens 8 can be determined.

Figure 15:
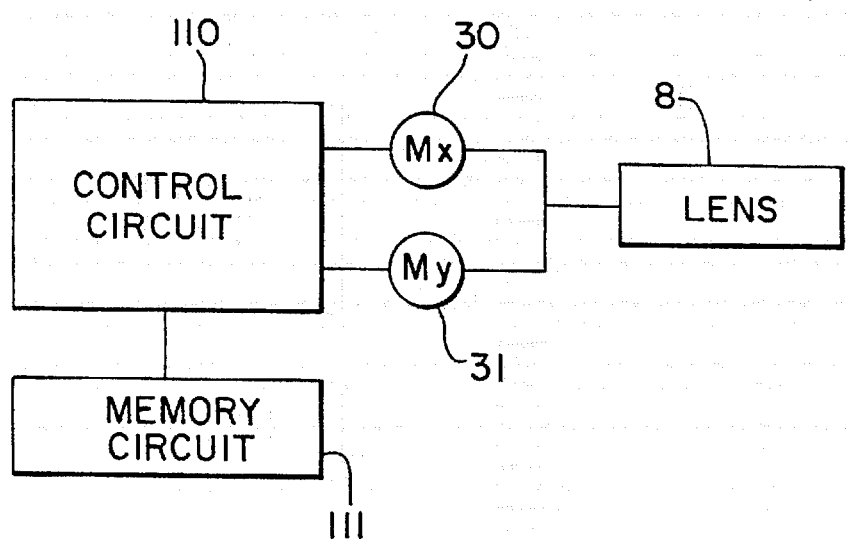
FIG. 15 is a block diagram of an information output unit which outputs information to drive the blur prevention device shown in FIG. 11.

In this regard, DC motors 30 and 31 for the x-axis and for the y-axis, shown in FIG. 1, are connected to control circuit 110, shown in FIG. 15, prior to when the blur prevention device is assembled into the camera. Memory circuit 111 is connected to control circuit 110, and the central position drive information for blur prevention lens 8 is pre-memorized in memory circuit 111. Central position drive information is equivalent to the number of pulses that are output from the photo interrupters 41x and 41y when blur prevention lens 8 is driven from one of the restricted positions (the position when rib parts 80xb and 80yb of restriction gears 80x and 80y indicated in FIGS. 7A and 7B come in contact with protruding parts 21g and 21i) up to the central position within the drivable range in the x direction and the y direction. The central position is the position of blur prevention lens 8 when protruding parts 21g and 21i are positioned in the central part of grooves 80xa and 80ya of restriction gears 80x and 80y. The number of pulses which are memorized may be a fixed value that is calculated in advance, but if higher accuracy is desired, it is also possible to drive blur prevention lens 8 from the restricted position on one side to the restricted position on the other side, calculate the number of pulses detected in between, and memorize one-half the number of those pulses.

Base 21, which retains blur prevention lens 8 and image blur prevention mechanism 20 described above, is attached to lens frame 5, and lens frame 5 supports lens group 7 and lens shutter 12. Prior to attachment, blur prevention lens 8 is positionally adjusted to the central position, and positional adjustments are performed in order to make the optical axes of blur prevention lens 8 and pre-lens group 7 agree.

First, DC motor 30 for the x-axis is driven and controlled according to the program within control circuit 110, and blur prevention lens 8 is driven up to the restricted position on one side of the x-axis. In this state, blur prevention lens 8 is driven to the central position until the number of pulses memorized in memory circuit 111 is detected. By doing this, blur prevention lens 8 is positioned in the central position in the x direction. In the y direction, DC motor 31 for the y-axis is driven and controlled in the same way, and blur prevention lens 8 is positioned in the central position in the y direction.

When the positional adjustment of blur prevention lens 8 to the central position is completed, positional adjustments are performed in order to make the optical axes of blur prevention lens 8 and lens group 7 agree.

Figure 16:
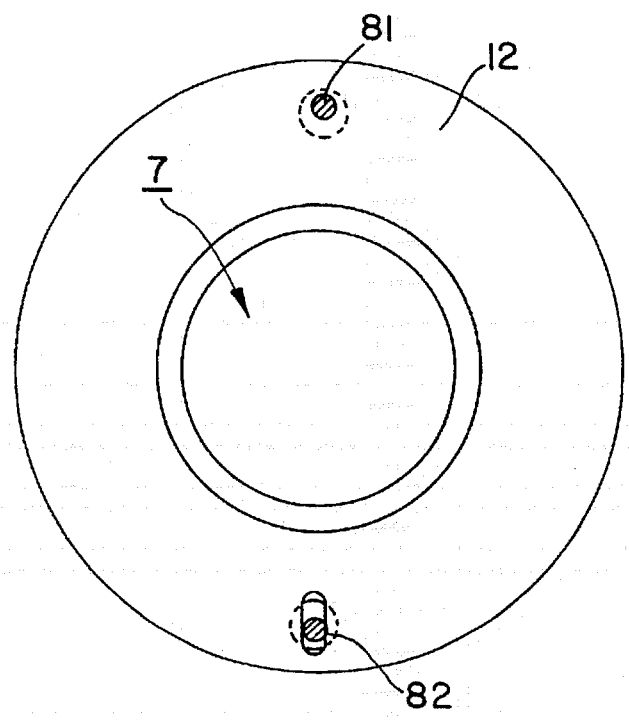
FIG. 16 is a diagram showing pins inserted into a base of a camera of FIG. 11.

Specifically, as indicated in FIGS. 14 and 16, the head parts of eccentric pins 81 and 82 are inserted through the hole parts 21C and 21D of base 21, and the shaft parts of eccentric pins 81 and 82 pass through hole 5B and long hole 5C that are formed in lens frame 5. At this time, protruding parts 21E and 21F, which are formed in base 21, are in contact with the outer surface of lens frame 5. In this state, for example, a laser light source and a light receiving part (for example, CCD) are arranged on either side of lens groups 7 and 8, and the laser light is irradiated so as to pass through lenses 7 and 8 in that order.

When rotating the top of eccentric pin 81 from the lens frame 5 side, base 21 moves in relation to lens frame 5, and the optical axis of lens group 8 is moved in the up and down direction and the left and right direction, and accompanying this, the light receiving position of the light receiving part changes. Here, the lower portion of base 21 is prevented from moving in the left and right direction by lower eccentric pin 82 and long hole 5C and, therefore, the amount of movement of the optical axis of lens group 8 in the left and right direction is small compared to the amount of movement in the up and down direction. When the light receiving part comes to the correct position, rotation of upper eccentric pin 81 is terminated.

Next, when rotating lower eccentric pin 82, base 21 moves in relation to lens frame 5, and the optical axis of lens group 8 moves in the left and right direction. When the light receiving position in the left and right direction of the light receiving part comes to the correct position, rotation of lower eccentric pin 82 is terminated.

By the above adjustment operations, blur prevention lens 8 can be positioned in the central position, and the optical axis of blur prevention lens 8 and the optical axis of lens group 7 can be made to agree. In addition, when rotating lower eccentric pin 82, base 21 moves a little bit in the up and down direction, but the amount of that movement is very small and can be ignored in terms of optical precision.

When positional adjustment of base 21 has been completed, machine screws 101 are inserted into hole parts 5A of lens frame 5, as shown in FIG. 12, and are fastened to screw holes 21B of base 21. By doing this, base 21 is attached to lens frame 5, and lens shutter 12, in a state where the optical axes of lenses 7 and 8 agree, is made into a single unit blur prevention device. Here, the diameter of hole part 5A of lens frame 5 is made bigger than the shaft of machine screw 101, as shown in the diagram and, therefore, there is no problem with the positional adjustment even if the position of base 21 changes a little in relation to lens frame 5.

Moreover, by stipulating a suitable height for protruding parts 21A and 21E (shown in FIGS. 12 through 14) of base 21, when base 21 is attached to lens frame 5, the gap between lenses 7 and 8 automatically becomes an appropriate value. Specifically, the positional determination of the optical axis direction of base 21 becomes automatic.

The lens shutter unified type blur prevention device is incorporated into the camera in the next process. After blur prevention lens 8 has been driven during photography and if memory circuit 111 has memorized the central position drive information, blur prevention lens 8 can be accurately returned to the central position prior to subsequent photography. Specifically, to return blur prevention lens 8 to the central position, blur prevention lens 8 is driven all the way up to the restricted position, and from there it may be driven toward the central direction until the memorized pulse number is detected. Here, because of the previously described positional adjustment, the optical axes of blur prevention lens 8 and lens group 7 agree when lens group 8 is in the central position, and thus there is no optically negative effect during subsequent photography.

In the fifth embodiment described above, blur prevention lens 8 comprises the blur prevention optical system, image blur prevention mechanism 20 comprises the drive mechanism, lens frame 5 comprises the first retaining unit, base 21 comprises the second retaining unit 21, memory circuit 11 comprises the information output unit, and eccentric pins 81 and 82 comprise the position adjustment unit.

In addition, because there are limitations to the precision of the position adjustment method described above using eccentric pins 81 and 82, the optical axes of both lenses 7 and 8 may be made to precisely agree by making fine adjustments of blur prevention lens 8 at a right angle direction to the optical axis using motors 30 and 31 after rough adjustment using the eccentric pins 81 and 82. In this situation, blur prevention lens 8 is slightly off from the central position, but the amount of displacement is extremely small, and will not hinder the driving of blur prevention lens 8.

Figure 17:
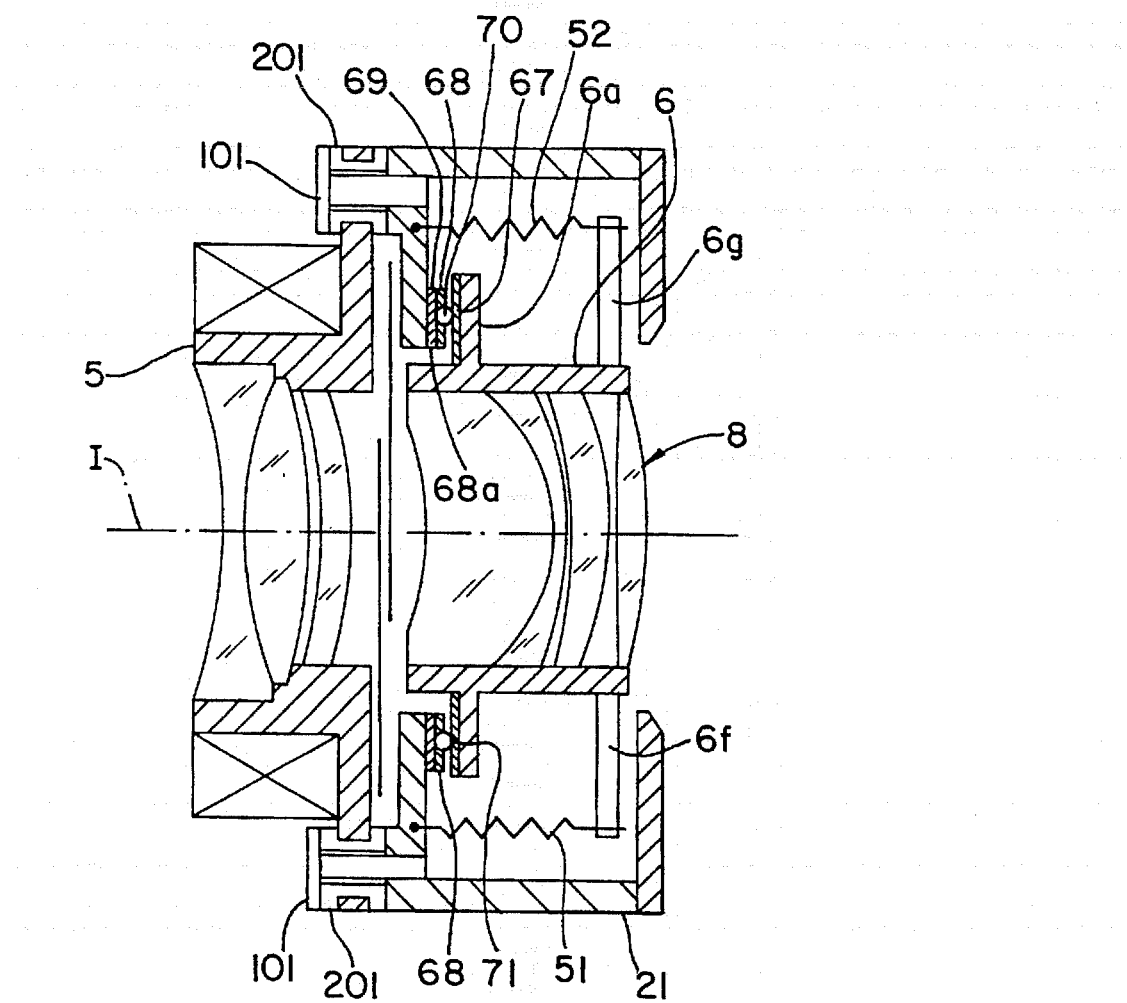
FIG. 17 is a cross-sectional diagram of the blur prevention device along the IV—IV line of FIG. 1, according to a sixth embodiment of the present invention.

FIG. 17 shows a sixth embodiment in which, when base 21 is attached to lens frame 5, rubber damper 201 is arranged around machine screws 101. By doing this, the vibration transmitted from lens shutter 21 to blur prevention lens 8 as well as the vibration transmitted from image blur prevention mechanism 20 to lens shutter 21 is kept to a minimum, and therefore, there is no negative effect on the driving of blur prevention lens 8 and lens shutter 21.

Figure 18:
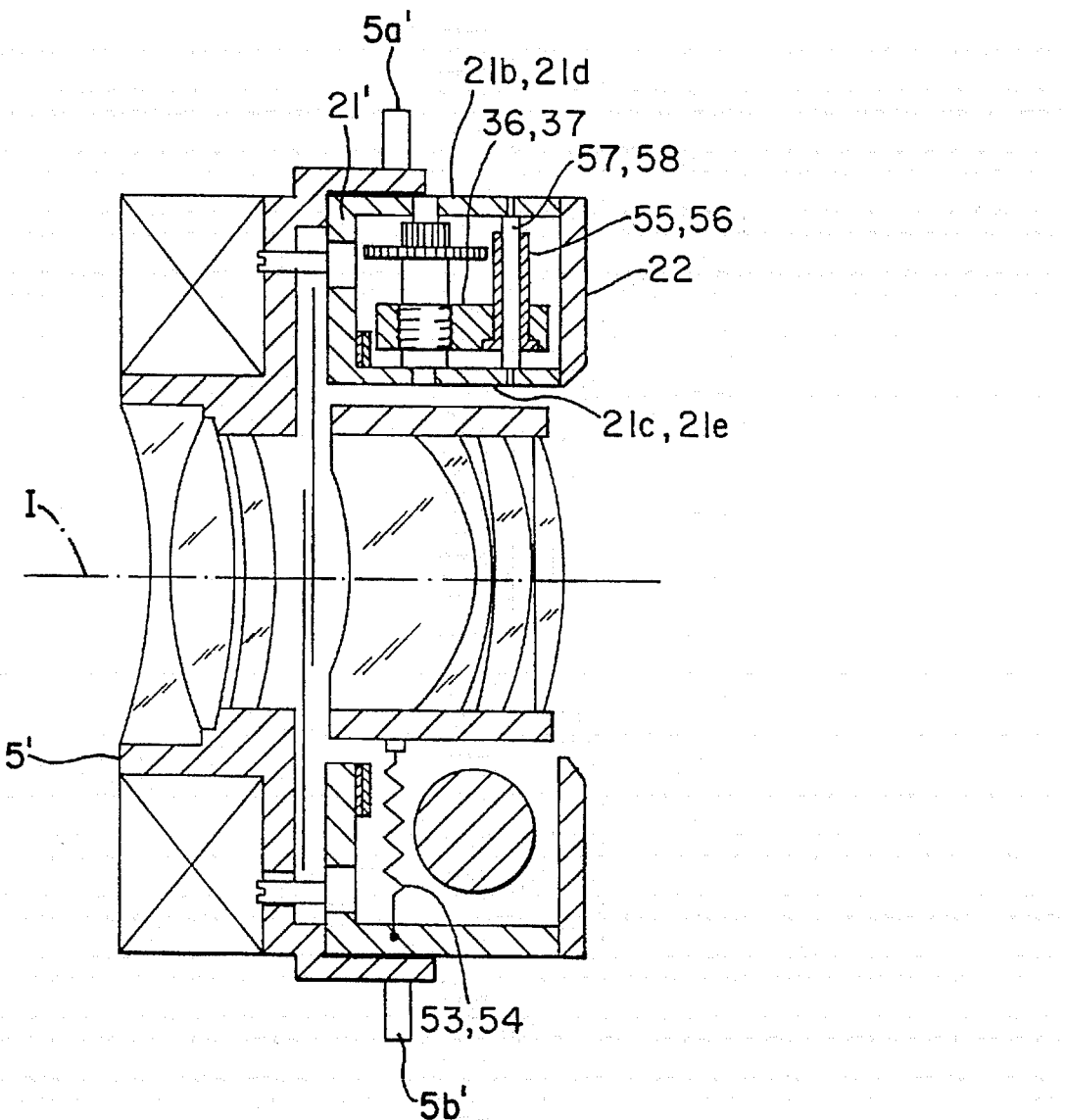
FIG. 18 is a cross-sectional diagram of the blur prevention device along the III—III line in FIG. 1, according to a seventh embodiment of the present invention.
Figure 19:
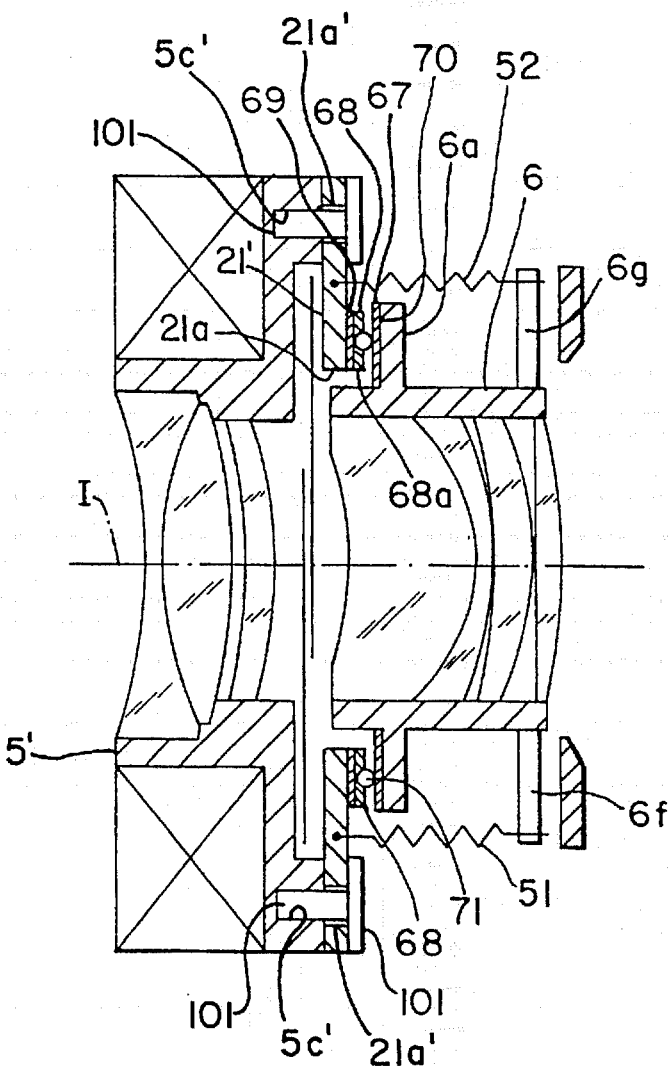
FIG. 19 is a cross-sectional diagram of the blur prevention device along the IV—IV line in FIG. 1, according to an eighth embodiment of the present invention.

Furthermore, FIG. 18 shows a seventh embodiment, wherein cam followers 5a' and 5b' are provided on the lens frame 5' side rather than on base 21. FIG. 19 shows an eighth embodiment, wherein machine screws 101 pass through the through holes 21a' provided on base 21', and are fastened to screw holes 5c' provided on lens frame 5'. By doing this, base 21' is attached to lens frame 5'.

Figure 20:
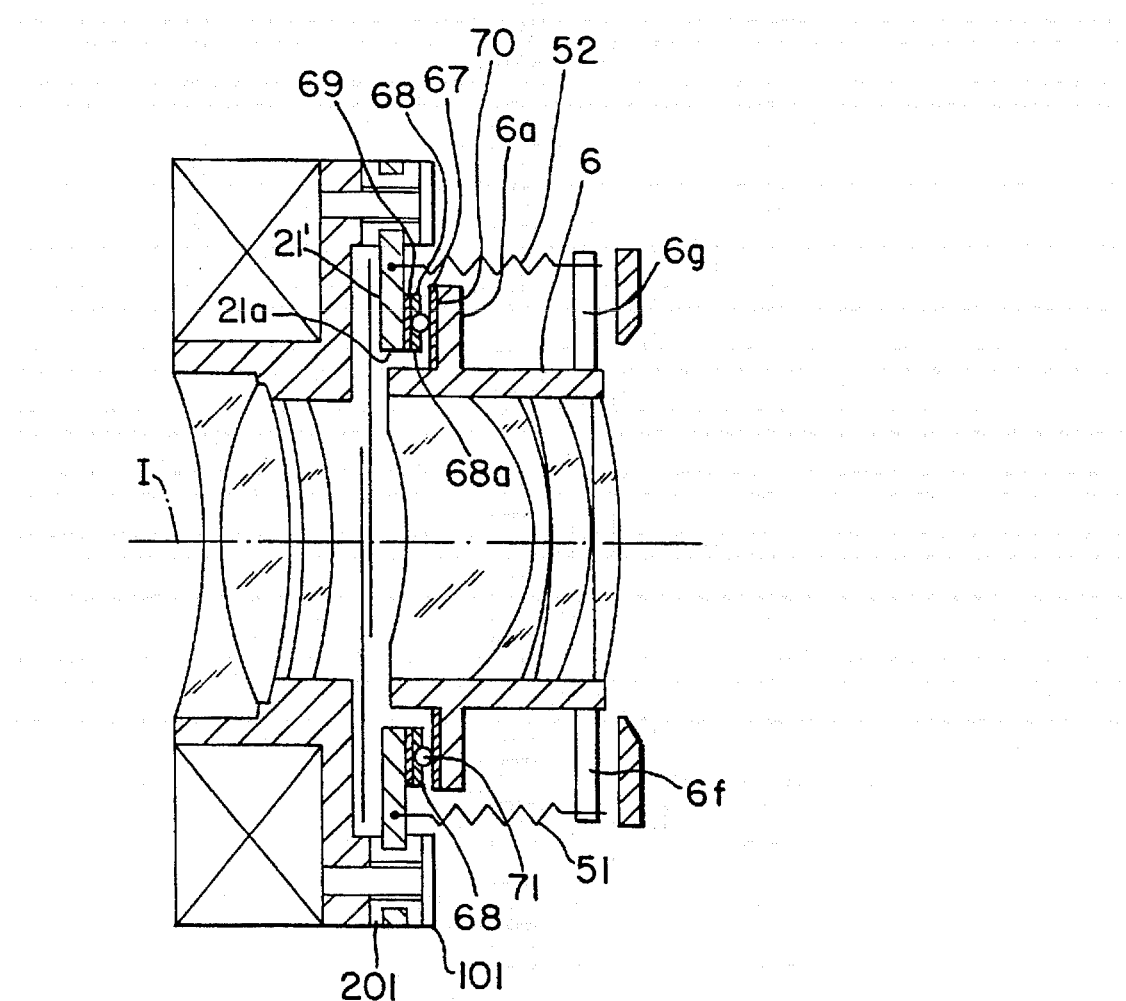
FIG. 20 is a cross-sectional diagram of the blur prevention device along the IV—IV line in FIG. 1, according to a ninth embodiment of the present invention.

Moreover, FIG. 20 shows a ninth embodiment, wherein rubber dampers 201 are arranged around the machine screws 101 of the eighth embodiment shown in FIG. 19.

As noted previously, motors 30 and 31 are the mechanisms which transmit the drive force to movable members 36 and 37 through a screw mechanism, but it is possible to use not only a screw mechanism, but also another type mechanism which converts rotational movement to linear movement, for example, a cam mechanism or a mechanism using levers, etc. Moreover, embodiments were shown and described such that the blur prevention device was made into a single unit with the lens shutter. When it is a blur prevention device that is used in interchangeable lenses, the device may also be unified with an aperture. Additionally, an embodiment was shown in which the blur prevention lens is provided in a zoom lens, but it may also be a single focus lens.

Figure 21A:
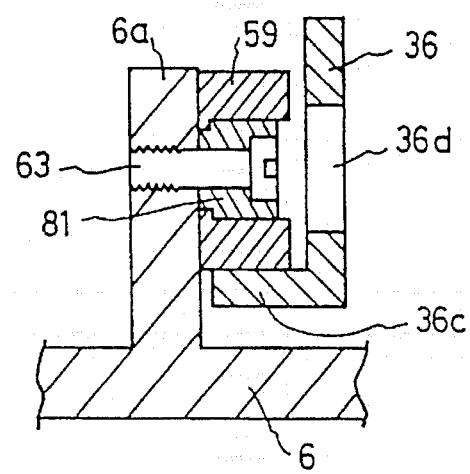
FIG. 21A is a cross-sectional diagram of roller parts of the blur prevention device according to a tenth embodiment of the present invention.
Figure 21B:
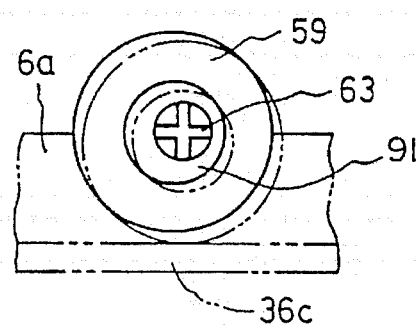
FIG. 21B is a conceptual side view diagram of the blur prevention device according to the tenth embodiment of the present invention.

FIGS. 21A and 21B show a tenth embodiment of the present invention, and parts which are the same or equivalent to those in the first embodiment will be given the same numbers and their detailed explanation will be omitted. Here, guide shafts 57 and 58 are installed together with shafts 34 and 35 on movable members 36 and 37, enabling movement in specified directions.

Further, guide shaft 57 and one side of guide shaft 58 are firmly secured in shaft receiving parts 21b, 21d or 21c, 21e of base 21 in the same way as in FIG. 2B in the first embodiment. Also, rollers 59, 60, 61 and 62 are attached to flange part 6a of lens frame 6 using roller shafts 63, 64, 65 and 66 so that they can freely rotate.

In at least one location of rollers 59 through 62, as indicated by roller 59 in FIGS. 20A and 20B, roller position adjustment member 91 is mounted as an adjustment member on roller shaft 63 (using a screw member) based on an eccentric cam capable of rotational displacement, and roller 59 is mounted on this roller position adjustment member 91. Thus, by adjusting the rotational position of roller shaft 63, as is shown in FIG. 21B, the position at which roller 59 is installed can be freely adjusted.

In this kind of configuration, by adjusting the position at which roller 59 is installed on flange part 6a using the rotational position of roller position adjustment member 91 accompanying the rotation of roller axis 63, the four rollers 59, 60, 61 and 62 can be brought into contact and properly seated at four points in relation to movable members 36 and 37, and similarly to the previous embodiment, excessive constraint is removed, half strike is averted, and the production of unnecessary stress on parts caused by an imbalance of partially abraded portions of the rollers can be avoided.

Specifically, when combining lens frame 6 with movable members 36 and 37 through the four rollers 59 through 62, three locations have specified conditions, but the one remaining location may be easily warped. Consequently, by using the adjustment member described above, the condition of roller strike at this remaining one location is adjusted, a state of contact and proper seating based on the four points of contact as a whole is guaranteed, thus eliminating excessive constraint.

The adjustment structure, in which roller 59 uses roller position adjustment member 91, is a fixed installation position adjustment in relation to flange part 6a, but a method of pressure attachment using a spring is also possible. Moreover, in FIG. 21A, window part 36d allows for rotational adjustments of roller 63 based on a screw member, and this is effective when making adjustments after assembly.

In addition, in the tenth embodiment described above, one of the rollers corresponding to movable member 36 of the x axis side is freely adjustable, but any one of the four rollers may be configured to freely adjust. Furthermore, if roller 59 at the position in the tenth embodiment described above is freely adjustable, there is the advantage that the adjusting stroke is small.

Figure 22:
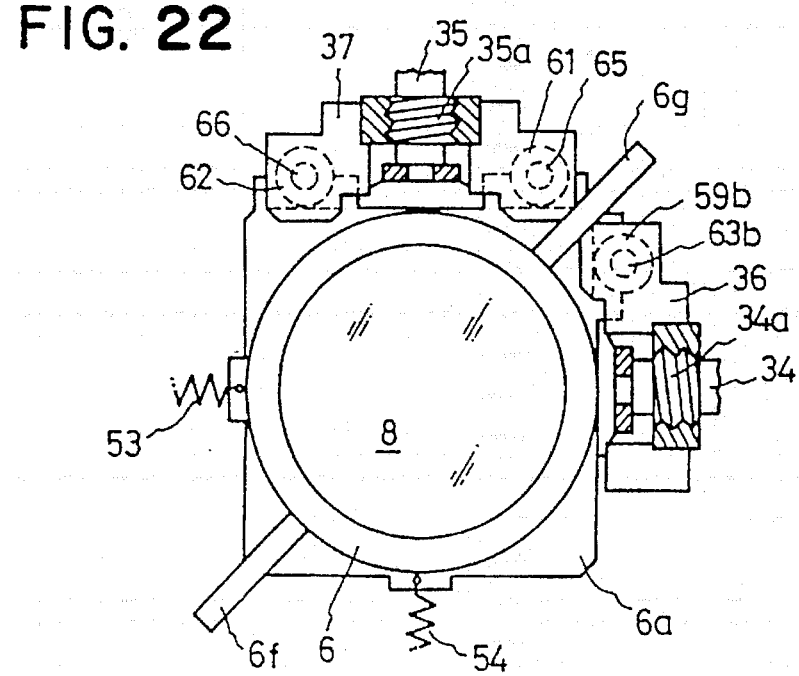
FIG. 22 is a conceptual diagram indicating the relationship of the lens frame and the movable members in an eleventh embodiment of the present invention.

FIG. 22 shows the essential parts of a blur prevention device according to an eleventh embodiment of the present invention. The same numbers are given to the parts in the diagram which are the same as the parts in FIGS. 1 through 5, and their detailed explanation is omitted.

In this eleventh embodiment, as in the tenth embodiment, guide shaft 57 and guide shaft 58 are firmly secured to shaft receiving parts 21b, 21d or 21c, 21e of base 21.

Roller shafts 63b, 65 and 66 are used to attach rollers 59b, 61 and 62 to the parts on the x axis and y axis sides at flange part 6a of lens frame 6 so that they can freely rotate. Thus, these three rollers 59b, 61 and 62 are formed to touch movable members 36 and 37 at three points.

Specifically, instead of lens frame 6 contacting movable members 36 and 37 of the x axis and y axis sides with four rollers, one side is contacted with only a single roller 59b, and lens frame 6 is formed to be supported by touching movable members 36 and 37 at three points. Thus, in this kind of configuration, the past problems related to excessive constraint caused by contacting four rollers can be eliminated.

In other words, in this kind of configuration, because movable members 36 and 37 can support lens frame 6 by contact at three points through rollers 59b, 61 and 62, no excessive constraint arises, half-strike is avoided, and an increase in the amount of partial abrasion and rolling force of the rollers can be prevented.

Drive in the x axis direction is executed through rollers 61 and 62 as guides, and drive in the y axis direction is guided by roller 59b. Consequently, because stable contact with rollers 61 and 62 controls the seating of lens frame 6 with movable member 37, the amount of force of spring 54 may be stronger than that of spring 53.

Also, the shape of one of movable members 36 and 37, namely, that of movable member 36, is modified and includes only one roller 59b. However, the present invention is not limited to this and may be structured so that the movable member 37 instead uses the same shape and is made to have only one roller. The essential feature is that a three point contact structure is adopted instead of a four point strike in order to prevent excessive constraint.

In addition, the present invention is not limited to the structures for the embodiments described above, and the shape and structure, etc., of each part that constitutes the blur prevention device, starting with image blur prevention mechanism 20, can be suitably transformed and modified.

For example, the tenth and eleventh embodiments described above, it was indicated that the structure of the x axis side transfer system is improved when guide shaft 57 is made movable, when structuring the position of at least one roller 59 to adjust freely based on roller shaft position adjustment member 91 using an eccentric cam, or when removing one roller. However, the y axis may also be the location for using these, and the embodiments may be suitably modified.

Also, in the embodiments described above, the present invention was applied to a camera having lens shutter 12, but it is not limited to this, and may be used in blur prevention lenses which shift in the direction at right angles to optical axis I in order to prevent image blur caused by hand shaking in other types of cameras. Therefore, the present invention is not limited by camera structure.

Furthermore, the blur prevention device related to the present invention is not restricted to cameras as described above, and can be applied to a variety of other optical instruments and equipment.

Although a few preferred embodiments of the present invention have been shown and described, it would be appreciated by those skilled in the art that further changes may be made in these embodiments without departing from the principles and spirit of the invention, the scope of which is defined in the claims and their equivalents.

What is claimed is:

1. A blur prevention device having a movable blur prevention lens for preventing image blur, the blur prevention device comprising:

a drive unit to produce an amount of movement to move the blur prevention lens in a first direction;

a transfer unit to transfer the amount of movement to the blur prevention lens;

a transfer receiving unit, connected to the blur prevention lens, to receive the amount of movement from said transfer unit to move the blur prevention lens in the first direction, said transfer receiving unit being movable in a second direction orthogonal to the first direction; and an adjustment unit to adjust an attachment positional relationship between said transfer unit and said transfer receiving unit.

2. The blur prevention device as claimed in claim 1, wherein:

said transfer receiving unit receives, from said transfer unit, the amount of movement at two separate locations; and said adjustment unit modifies, in the first direction, a position of at least one of the two separate locations.

3. A blur prevention device having a movable blur prevention lens for preventing image blur, the blur prevention device comprising:

a first drive unit to produce a first amount of movement to move the blur prevention lens in a first direction;

a second drive unit to produce a second amount of movement to move the blur prevention lens in a second direction;

a first transfer unit to transfer the first amount of movement to the blur prevention lens;

a second transfer unit to transfer the second amount of movement to the blur prevention lens;

a first transfer receiving unit, connected to the blur prevention lens, to receive the first amount of movement from said first transfer unit to move the blur prevention lens in the first direction, said first transfer receiving unit being movable in the second direction;

a second transfer receiving unit, connected to the blur prevention lens, to receive the second amount of movement from said second transfer unit to move the blur prevention lens in the second direction, said second transfer receiving unit being movable in the first direction;

a first guide, having first and second fixed ends, to regulate movement of said first transfer unit to be within said first direction; and a second guide, having one fixed end and one end having a limited range of movement, to allow movement of said second transfer unit to be outside said second direction.

4. The blur prevention device as claimed in claim 3, wherein:

said first transfer receiving unit comprises first and second rollers aligned parallel to the second direction; and said second transfer receiving unit comprises third and fourth rollers aligned parallel to the first direction.

5. The blur prevention device as claimed in claim 4, further comprising:

first and second resilient members to provide a resilient force to the blur prevention lens in a direction parallel to an optical axis of the blur prevention lens.

6. The blur prevention device as claimed in claim 4, further comprising:

a first resilient member to provide a resilient force to the blur prevention lens in a direction parallel to the first direction; and a second resilient member to provide a resilient force to the blur prevention lens in a direction parallel to the second direction.

7. A blur prevention device having a movable blur prevention lens for preventing image blur, the blur prevention device comprising:

a first drive unit to produce a first amount of movement to move the blur prevention lens in a first direction;

a second drive unit to produce a second amount of movement to move the blur prevention lens in a second direction;

a first transfer unit to transfer the first amount of movement to the blur prevention lens;

a second transfer unit to transfer the second amount of movement to the blur prevention lens;

a first transfer receiving unit, connected to the blur prevention lens, to receive the first amount of movement from said first transfer unit to move the blur prevention lens in the first direction, said first transfer receiving unit being movable in the second direction;

a second transfer receiving unit, connected to the blur prevention lens, to receive the second amount of movement from said second transfer unit to move the blur prevention lens in the second direction, said second transfer receiving unit being movable in the first direction; and an adjustment unit to adjust an attachment positional relationship between said second transfer unit and said second transfer receiving unit.

8. The blur prevention device as claimed in claim 7, wherein:

said second transfer receiving unit receives, from said second transfer unit, the second amount of movement at two separate locations; and said adjustment unit modifies, in the second direction, a position of at least one of the two separate locations.

9. The blur prevention device as claimed in claim 7, wherein:

said first transfer receiving unit comprises first and second rollers aligned parallel to the second direction; and said second transfer receiving unit comprises third and fourth rollers aligned parallel to the first direction.

10. The blur prevention device as claimed in claim 9, further comprising:

first and second resilient members to provide a resilient force to the blur prevention lens in a direction parallel to an optical axis of the blur prevention lens.

11. The blur prevention device as claimed in claim 9, further comprising:

a first resilient member to provide a resilient force to the blur prevention lens in a direction parallel to the first direction; and a second resilient member to provide a resilient force to the blur prevention lens in a direction parallel to the second direction.

12. A blur prevention device having a movable blur prevention lens for preventing image blur, the blur prevention device comprising:

a first drive unit to produce a first amount of movement to move the blur prevention lens in a first direction;

a second drive unit to produce a second amount of movement to move the blur prevention lens in a second direction;

a first transfer unit to transfer the first amount of movement to the blur prevention lens;

a second transfer unit to transfer the second amount of movement to the blur prevention lens;

a first transfer receiving unit, connected to the blur prevention lens, to receive the first amount of movement from said first transfer unit at two separate locations to move the blur prevention lens in the first direction, said first transfer receiving unit being movable in the second direction; and a second transfer receiving unit, connected to the blur prevention lens, to receive the second amount of movement from said second transfer unit at only one location to move the blur prevention lens in the second direction, said second transfer receiving unit being movable in the first direction.

13. The blur prevention device as claimed in claim 12, wherein:

said first transfer receiving unit comprises first and second rollers aligned parallel to the second direction; and said second transfer receiving unit comprises a third roller.

14. The blur prevention device as claimed in claim 13, further comprising:

first and second resilient members to provide a resilient force to the blur prevention lens in a direction parallel to an optical axis of the blur prevention lens.

15. The blur prevention device as claimed in claim 13, further comprising:

a first resilient member to provide a resilient force on the blur prevention lens in a direction parallel to the first direction; and a second resilient member to provide a resilient force to the blur prevention lens in a direction parallel to the second direction.

16. A blur prevention device in an optical system, the blur prevention device having a blur prevention lens movable in a first linear direction orthogonal to an optical axis of said optical system, the blur prevention device comprising:

a drive power generation unit to produce rotational drive power;

a drive power transmission unit to transmit the rotational drive power to the blur prevention lens, said drive power transmission unit including a first speed reduction gear array to reduce a speed of the rotational drive power, and to generate a reduced drive power, and a movement generation mechanism to receive the reduced drive power and, in response to the reduced drive power, move the blur prevention lens in the first linear direction; and a restriction unit to limit a range of the blur prevention lens in the first linear direction, said restriction unit being connected to said first speed reduction gear array and spaced apart from said movement generation part.

17. The blur prevention device as claimed in claim 16, wherein said restriction unit further comprises:

a second speed reduction gear array to mechanically limit the range of the blur prevention lens in the first linear direction.

18. The blur prevention device as claimed in claim 17, wherein said second speed reduction gear array comprises:

a gear member which is mechanically restricted to rotate in a first rotational direction and a second rotational and within a gear member range of one rotation.

19. The blur prevention device as claimed in claim 18, wherein:

said gear member further comprises a gear shaft about which said gear member rotates;

said blur prevention device further comprises a shaft receiving part for maintaining an orientation of said gear shaft;

a first force acting upon said shaft receiving part while said gear member is at a first limit position in said first rotational direction is less than a second force acting upon said shaft receiving part while said gear member is at a second limit position in said second rotational direction.

20. The blur prevention device as claimed in claim 16, a second speed reduction gear array to electrically limit the range of the blur prevention lens in the first linear direction.

21. The blur prevention device as claimed in claim 20, wherein said second speed reduction gear array comprises:

a gear member which is electrically restricted to rotate in a first rotational direction and a second rotational direction and within a gear member range of one rotation.

22. A blur prevention device in an optical system having one of a lens shutter and an aperture, the blur prevention device having a blur prevention lens movable within a movable range in a first direction orthogonal to an optical axis of said optical system by a drive system, the blur prevention device comprising:

a first retention unit to retain said one of said lens shutter and aperture in a ready state;

a second retention unit to retain the blur prevention lens to be movable in the first direction, to retain the drive system and is attached to said first retention unit;

an information output device to output information related to driving the blur prevention lens to a central position of the movable range; and a position adjustment unit to adjust positions of said first and second retention units relative to the first direction.

23. The blur prevention device as claimed in claim 22, further comprising a damping apparatus to attach said first retention unit to said second retention unit.

24. A blur prevention device in an optical system having one of a lens shutter and an aperture, the blur prevention device having a blur prevention lens movable within a movable range in a first direction orthogonal to an optical axis of said optical system by a drive system, the blur prevention device comprising:

a first retention unit to retain said one of said lens shutter and aperture in a ready state;

a second retention unit to retain the blur prevention lens to be movable in the first direction, to retain the drive system and is attached to said first retention unit; and a position adjustment unit to adjust positions of said first and second retention units.

25. The blur prevention device as claimed in claim 24, further comprising a damping apparatus to attach said first retention unit to said second retention unit.

* * * * *

UNITED STATES PATENT AND TRADEMARK OFFICE
CERTIFICATE OF CORRECTION

PATENT NO. : 5,715,479
DATED : February 3, 1998
INVENTOR(S) : Akira KATAYAMA, et al.

It is certified that error appears in the above-identified patent and that said Letters Patent is hereby corrected as shown below:

Column 22, line 3, claim 15, change "on" to --to--; and line 39, claim 18, after "rotational" (second occurrence) insert --direction--.

Signed and Sealed this

Twenty-eighth Day of April, 1998

Attest:

BRUCE LEHMAN

Attesting Officer

Commissioner of Patents and Trademarks